(12) United States Patent
Dobson et al.

(10) Patent No.: US 8,032,131 B2
(45) Date of Patent: Oct. 4, 2011

(54) MOBILE PHONE NETWORK MANAGEMENT SYSTEMS

(75) Inventors: Robert William Albert Dobson, Chiswick (GB); Christopher Kolless, Hertfordshire (GB); Martin Hunt, London (GB); Andy Hennah, Middlesex (GB); Daniel Escott, Surrey (GB)

(73) Assignee: Actix Limited (GB)

( * ) Notice: Subject to any disclaimer, the term of this patent is extended or adjusted under 35 U.S.C. 154(b) by 939 days.

(21) Appl. No.: 11/871,732

(22) Filed: Oct. 12, 2007

(65) Prior Publication Data

US 2009/0075655 A1   Mar. 19, 2009

(30) Foreign Application Priority Data

Sep. 14, 2007   (GB) .................................. 0717904.7

(51) Int. Cl.
*H04Q 7/20* (2006.01)
(52) U.S. Cl. ..................... 455/423; 370/244; 370/250
(58) Field of Classification Search .................. None
See application file for complete search history.

(56) References Cited

U.S. PATENT DOCUMENTS

| 6,118,936 | A | 9/2000 | Lauer |
| 6,829,491 | B1 | 12/2004 | Yea et al. |
| 7,353,160 | B2 | 4/2008 | Voigt |
| 7,653,395 | B2 | 1/2010 | Samuelsson |
| 2004/0266442 | A1 | 12/2004 | Flanagan et al. |
| 2006/0141947 | A1 | 6/2006 | Samuelsson |
| 2006/0227754 | A1 | 10/2006 | Ko |
| 2006/0235674 | A1 | 10/2006 | Voigt |
| 2007/0254644 | A1* | 11/2007 | Dobson et al. ............. 455/423 |
| 2007/0280123 | A1 | 12/2007 | Atkins et al. |
| 2007/0291757 | A1 | 12/2007 | Dobson et al. |
| 2008/0004035 | A1 | 1/2008 | Atkins et al. |
| 2008/0020731 | A1 | 1/2008 | Kim et al. |
| 2009/0075648 | A1 | 3/2009 | Reed et al. |

FOREIGN PATENT DOCUMENTS

| WO | WO-00/11884 A1 | 3/2000 |
| WO | WO-03/055251 A1 | 7/2003 |
| WO | WO-2004/075050 A2 | 9/2004 |
| WO | WO-2004/084571 A1 | 9/2004 |

(Continued)

OTHER PUBLICATIONS

"International Application Serial No. PCT/GB2008/050751, International Search Report mailed Feb. 9, 2009", 3 pgs.

(Continued)

*Primary Examiner* — Phuoc Doan
(74) *Attorney, Agent, or Firm* — Schwegman, Lundberg & Woessner, P.A.

(57) ABSTRACT

A system for maintaining or optimizing a mobile phone network, the system includes a plurality of data feed inputs including at least one performance data feed input to receive performance data relating to performance of said mobile phone network over a first time period and at least one configuration data feed input to receive configuration data relating to configuration of said mobile phone network over a second time period; and a radio performance optimization system coupled to said plurality of data feed inputs, said radio performance optimization system including a rules engine to operate on said performance data and on said configuration data in accordance with a set of hierarchical rules and to output one or more tasks for network optimization, a said task including a definition of a potential fault, exception or optimization of said network to be investigated by a service engineer.

30 Claims, 16 Drawing Sheets

FOREIGN PATENT DOCUMENTS

| WO | WO-2005/034551 A1 | 4/2005 |
| WO | WO-2005/071890 A1 | 8/2005 |
| WO | WO-2005/086418 A1 | 9/2005 |
| WO | WO-2006/118539 A2 | 11/2006 |
| WO | WO-2007/006229 A1 | 1/2007 |

OTHER PUBLICATIONS

"International Application Serial No. PCT/GB2008/050751, Written Opinion mailed Feb. 9, 2009", 5 pgs.

"Great Britain Patent Application No. GB0717904.7, Search Report dated Jan. 12, 2008", 1 pg.

"U.S. Appl. No. 12/140,091 Non-Final Office Action mailed Jul. 12, 2010", 13 pgs.

"U.S. Appl. No. 12/140,091 Notice of Allowance mailed Nov. 1, 2010", 8 pgs.

"U.S. Appl. No. 12/140,091, Preliminary Amendment filed Jun. 16, 2008", 3 pgs.

"U.S. Appl. No. 12/140,091, Response filed Oct. 12, 2010 to Non Final Office Action mailed Jul. 12, 2010", 9 pgs.

* cited by examiner

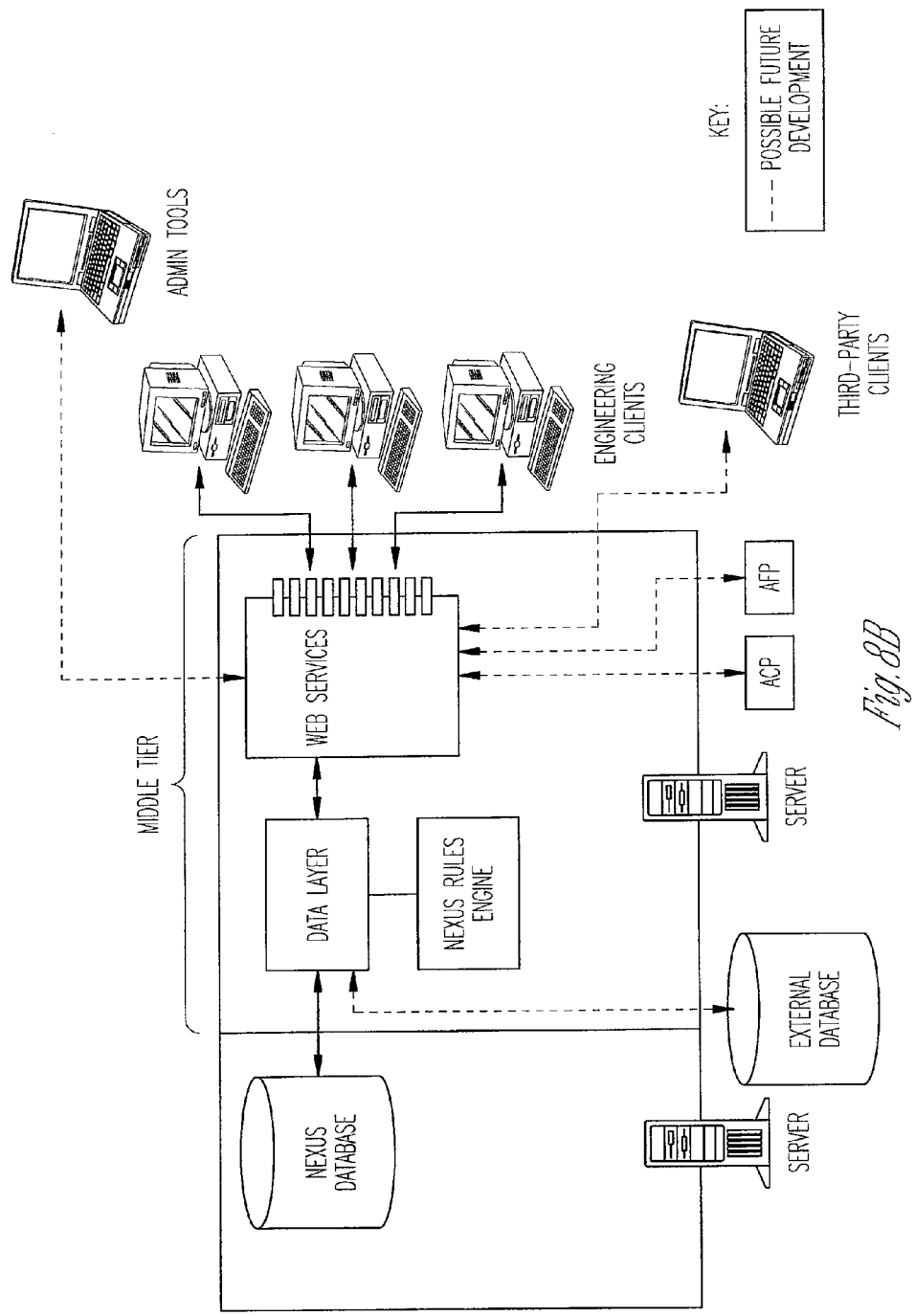

MOBILE PHONE NETWORK MANAGEMENT SYSTEMS

RELATED

This application claims priority under 35 U.S.C. 119 to United Kingdom Application No. 0717904.7, filed Sep. 14, 2007, which application is incorporated herein by reference and made a part hereof.

FIELD OF THE INVENTION

This invention relates to systems and methods for managing and optimizing mobile phone networks.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2007 Actix Limited.

BACKGROUND TO THE INVENTION

Typically network operations have a variety of hardware and software systems for managing their networks. For example, they have systems for billing, planning and configuring the network, configuring neighbor lists, measuring and managing performance, for triggering alarms and raising and managing trouble tickets. The data from all of these systems is usually stored in separate databases (sometimes with separate databases of each type for every region or administrative area) with little or no communication between them. This makes it hard for engineers to manage changes network performance. For example network operators would currently have difficulty associating a sudden rise in dropped calls with a change in the serving sector's antenna configuration that caused it.

Consequently in the course of their daily work, radio engineers usually use a multitude of different tools, each of which is limited to solving a specific problem. For example, an engineer when performing a routine daily investigation into base stations that have a high handover failure rate typically follows multiple manual steps, some of which are paper-based, and uses a variety of different tools. This is inefficient, error prone, and time consuming and does not facilitate the sharing of information and data between different engineers and teams.

There is therefore a need for improved tools for mobile phone network service engineers.

SUMMARY OF THE INVENTION

According to a first aspect of the invention there is therefore provided a system for maintaining or optimizing a mobile phone network, the system comprising: a plurality of data feed inputs including at least one performance data feed input to receive performance data relating to performance of said mobile phone network over a first time period and at least one configuration data feed input to receive configuration data relating to configuration of said mobile phone network over a second time period; and a radio performance optimization system coupled to said plurality of data feed inputs, said radio performance optimization system comprising a rules engine to operate on said performance data and on said configuration data in accordance with a set of hierarchical rules and to output one or more tasks for network optimization, a said task comprising a definition of a potential fault, exception or optimization of said network to be investigated by a service engineer.

Embodiments of the system may be employed not only for fault detection and correction but also for dealing with exceptions and so-called design checks (so that a network configuration meets design criteria). Still further embodiments of the system may be employed for pro-active network optimization rather than reactive response to perceived faults. Thus, broadly speaking, a task defines a condition of the network to be investigated by a service engineer in order to improve the performance of the network, either because a significant reduction in the usual performance has been detected or because a significant increase in the usual performance is desired.

In embodiments of the system the rules engine is configured to operate on the performance and configuration data using rules of at least two types, a first type to generate event data defining events relating to one or both of the configuration and performance, and a second type operating on the event data and optionally also on the performance and configuration data to identify a correlation in space and/or time in the event data, configuration data, and performance data. Thus preferably the hierarchical rules include at least one event rule and one correlation rule operating above this responsive to a configuration of multiple events. In preferred embodiments the performance and/or configuration data includes cell/sector-specific data so that events can be raised in relation to specific cells or sectors and/or radio or other components or elements of the network. Thus in preferred embodiments rules of the second type are able to correlate between a spatial and a temporal condition of the network, for example relating a changing configuration of a cell or sector to a drop or increase in performance. In embodiments this correlation extends over multiple sectors or cells, in particular over neighboring sectors or cells (these neighboring cells need not be physical neighbors but may be counted as neighbors if a handover/handoff is permitted between the cells or sectors). This facilitates sophisticated problem solving where, for example, a fault in one cell/sector causes a problem in a neighboring cell/sector which may happen, say, if one cell/sector fails and a mobile device connects to a more distant cell/sector than the one which would usually serve it.

Preferred embodiments of the system also include a third type of rule to infer a potential fault, exception or optimization using the identified correlation and/or one or more events and/or raw performance/configuration data. Optionally such a rule may include a confidence measure on a diagnosis to reduce the possibility of false triggers and/or may incorporate a requirement of multiple correlations or events one after another, for example to put the system into a watch state on a first trigger prior to making a diagnosis following a second trigger.

In some preferred embodiments the rules also enable a task to be allocated to a queue of tasks, for example associated with a group of service engineers. Rules may also include rules to priorities a task.

In embodiments of the system a performance data includes data from counters, for example from an OSS (Operations and Support Systems)/OMC (Operations and Maintenance Centre) of a network performance management system of the network providing statistics such as number of dropped calls, number of hours on air and the like at various levels within the network including cell, sector, and neighbor level. Performance data may also include output data from one or more specific diagnostic programs operating in the network. The performance data may be derived from multiple network elements and may comprise multiple files; it may be discrete, that is captured at time intervals, for example the end of each day or it may comprise a substantially live feed, for example hourly or more frequent. In embodiments the configuration data comprises data such as radio parameters, aerial azimuths and other physical attributes of the network. Typically this data changes relatively infrequently and thus may be referred to as "continuous" data; in some preferred embodiments where configuration data is stored, this data is stored in terms of initial values and changes, to reduce storage requirements. Configuration data may be obtained from, for example, a planning tool database for the network. The data feed inputs may further comprise an external data feed to received data such as alarms, reboot data (indicating whether or not a network element has been rebooted), trouble tickets (engineer performance reports) user defined events (for example a counter increasing above a threshold) and the like. Such data may be available, for example, from a network management system on the OSS. Typically this data is input in discrete form, for example daily although a substantially live feed may be additionally or alternatively be employed. Other types of data feed include a drive test data feed, which is particularly useful for network optimization. Examples of events which may be generated by event rules include an alert on a configuration change, an alert on a performance change, an alert to an equipment problem, for example an equipment alarm, and a user action alert (trouble ticket). Other events include volume events, traffic events, integrity events and the like. In some preferred embodiments rules for event triggering are predetermined and incorporated in the system, for example stored in local or non-local, non-volatile memory. Optionally a predetermined set of correlation rules applying to one or more predetermined sets of conditions is also provided.

In some preferred embodiments of the system an ability to provide a cell/sector or network element signature is provided. This may comprise historical performance data and may include a facility or rule to detect a long-term trend or change in performance, for example over 3, 6, 9 or 12 months or more. Such a site signature can be useful in identifying performance changes over long periods, for example due to cell/sector occupancy (say, near a beach in summer) or radio propagation, for example trees growing/shedding leaves, seasonal snow on mountains or the like.

Preferred embodiments of the system store some or all of the performance and configuration data in a database and provide a common window or front end onto this database, preferably abstracting the data in the database. This facilitates a generic front end for the rules for a range of different networks and, by providing additional functionality, facilitates rule construction. In embodiments the common interface is configured to implement a set of procedures or objects to operate on the data from the data feeds and to provide a common data access specification for this data. Optionally such procedures may include one or more key performance indicators (KPIs). This facilitates correlations between, for example, two such KPIs or a KPI and a configuration change. Such a KPI may comprise, for example, an aggregated metric of performance of the network derived from data from a plurality of different elements of the network.

In some preferred embodiments the interface comprises a two-way interface enabling events detected by rules to be stored back into the database. This facilitates implementation of higher level rules.

As previously described, in embodiments the rules are hierarchical and result in the output of tasks for service engineers, broadly speaking a task comprising a suggested fault identified for an engineer to address (for example, "receiver fault in sector X"). Optionally, however, a task may include a suggested diagnosis or fix for the fault, optionally with a confidence level. The confidence level may be determined, for example, by data entered back into the system by a service engineer, the system then determining, say, in what percentage of cases a particular fix corrected the fault. In other embodiments of the system correction of a fault may be detected automatically by the radio performance optimization system, based upon the performance and/or configuration data. Optionally feedback either manual or automatic from the result of intervention by a service engineer may be employed to modify or amend one or more rules, in order to make the system learning. There even exists the potential for a network to become at least partially self-healing/optimizing. In embodiments the radio performance optimization system monitors performance and/or configuration data from a plurality of cells/sectors, in particular neighboring cells/sectors of one on which a task has been performed since action on one cell/sector may influence and potentially correct problems on another cell/sector by especially a physically or logically neighboring cell or sector.

In embodiments of the system the radio performance optimizer rules engine is able to operate on a collection of data from data feeds covering a group of cells/sectors, for example 10, 20 or more cells/sectors, which is particularly advantageous for network optimization since this is best performed over a group of cells rather than individually cell or sector by cell or sector. In embodiments changes may be made and the effect on neighboring cells/sectors may be monitored and further changes made to achieve optimization over an area of the network.

As previously mentioned rules may be predetermined but in some preferred embodiments of the system rules may also be defined by a service engineer and stored for later use. In embodiments a user interface and program operating systems such as an interpreter or compiler is provided to enable a user to define one or more rules using a programming language such as parsed expression language. However in some particularly preferred embodiments a graphical rule definition interface is also provided, for example using drag and drop programming or workflow programming or, in particular, by providing a graphical representation of an operation performed by a rule operating on a plurality of events. One preferred format is a grid or tabular format in which columns (or rows) are associated with events and rows (are columns) are associated with correlation outputs for example to identify potential faults, exceptions or optimizations. In such a case a user may define an entry in a grid position associating an event on a column with an output on a row and logical combinations of events may be described by multiple entries in a row, one at each column location to which a logical operation on an event is desired. Thus, broadly speaking, in some preferred embodiments one or more of the rules are defined by a form of spreadsheet.

In preferred embodiments a service engineer user interface is provided for task output in which the user is able to access one or more tasks and, in addition, to list one or more events and/or correlations or other intermediate data items which contributed to the task. Preferably a user is also able to list one or more network elements to which the task relates, and optionally other data relating to the task, for example an earliest/latest event date, or more generally, a view of historical data relating to one or more events on which the task is based. In some particularly preferred embodiments the user interface comprises a graphical user interface representing a task on a graphical map of the network including representations of cells and/or cell sectors of the network, preferably also providing drill-down from a task down to one or more events as previously described.

In a related aspect the invention provides an automated performance management system for a digital mobile phone network, the system comprising: a rule input to receive rules for operating on data from said network; a data input to receive one or both of performance and configuration data from said network; and a rules engine coupled to said rule input and to said data input to operate on said data from said network using said rules, and wherein said rules engine comprises: an event layer to identify changes in one or both of said performance and configuration data and in response to generate events; and a correlation layer to operate on combinations of said events to identify potential faults, exceptions, or optimizations of said network.

Preferably the rules engine includes a diagnosis layer to output data from the correlation layer relating to multiple identified potential faults, exceptions or optimizations, to thus provide increased confidence or probability of identification of a potential fault, exception or optimization, in particular, from a "signature" of the condition. Still further preferably a workflow layer is also provided to allocate one or more of the potential faults, exceptions or optimizations to one or more tasks as described above. Preferably such tasks are output on a graphical user interface as described; still further preferably a task grouping system is provided to enable tasks to be allocated to one or more queues, for example according to business rules. In embodiments the workflow layer may also manage the tasks, for example manually or automatically verifying and closing a task.

In a related aspect the invention provides an interface to a plurality of data feeds from a digital mobile phone network, said data feeds including at least one performance data feed input to receive performance data relating to performance of said mobile phone network over a first time period and at least one configuration data feed input to receive configuration data relating to configuration of said mobile phone network over a second time period, wherein said interface is configured to implement a common set of procedures across said plurality of data feeds to provide a common data access specification for said data from said data feed inputs.

In some preferred embodiments the procedures (or objects) include one or more of a set of operator or network provider conversion procedures to map from a data format specific to an operator of the network to a data format of the common data access specification, a set of event procedures to identify (or to record back into a database to which the interface is attached) events in the network, a set of network model procedures to provide data on the configuration of elements in the network, and a set of network attribute procedures to provide data relating to attributes of the network, for example a list of attributes, say at a cell/sector level, and/or values of attributes, and or historical values and the like.

Preferably the interface is attached to a data store storing one or both of the afore-mentioned performance and configuration data, although in other embodiments the interface may provide a window onto a database managed, for example, by a network operator to provide some of the data to which the common interface gives access. Thus in embodiments the interface provides a window or aggregation point for multiple databases providing a common data access specification and a common set of procedures abstracting the data in the databases. In this way, for example, a common window may potentially be provided to data relating to multiple different logical networks which may share at least part of a physical network. This is particularly advantageous because of the growing trend for network operators to share physical network elements such as cell/sector elements.

BRIEF DESCRIPTION OF THE DRAWINGS

These and other aspects of the invention will now be further described, by way of example only, with reference to the accompanying figures in which:

FIGS. 8a and 8b show implementations of the middle tier of the Nexus platform;

DETAILED DESCRIPTION OF PREFERRED EMBODIMENTS

Broadly speaking, the embodiments of the present invention provide an automated performance management system for a digital mobile phone network that streamlines an engineers' work. The system utilizes the data in the network's existing systems and uses built-in intelligence to generate engineering tasks based on events that are detected in the data and to provide the engineer with a simple, process-driven desktop application (sometimes referred to as the engineering client) based around a task list and a map. The engineering client makes it easy for engineers to make fast and effective optimization decisions by combining their local knowledge (for example, about problems that started when the cranes were erected for that new tower block that is being built near the shopping mall) with the system's automated decision aids. The system also facilitates communication between and within the engineering teams.

Figure 1:
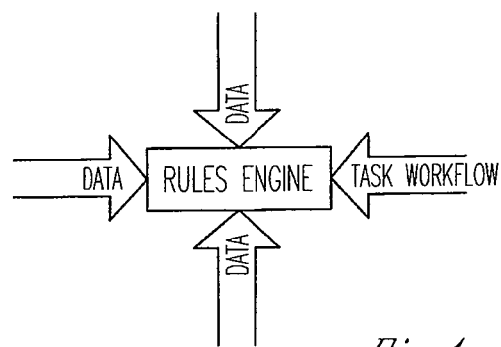
FIG. 1 shows the underlying concept of the present invention.

FIG. 1 illustrates the concept underlying the system. Data is obtained from a plurality of sources and input into a rules engine. The rules engine processes the data to generate a task workflow that attempts to optimize the digital mobile phone network. The task workflow is, in effect, a list of tasks that are provided to the engineer to address identified problems and component optimization. Example tasks may, for example, include (but are not limited to) simple commands to reboot the Base Station Controller (BSC), adjust the frequency in a particular cell or sector, to close an alarmed service hatch or access panel on the Base Station, or other such commands. The methods used in and structure of rules engine will be discussed in detail below.

In its simplest form, the rules engine attempts to optimize the network based on the data received from the system. Network optimization is the process of improving the performance of a radio network through planned changes to its design. However, it is difficult to judge whether optimization work has been successful unless the performance of the network is relatively stable. This requires continuous remedial action—otherwise performance degrades over time, because of the tendency for network equipment to deteriorate with age and heavy use. This continuous remedial action is sometimes referred to as housekeeping and although it is not strictly an optimization activity, it is closely related to optimization and is frequently performed by the same personnel.

Because housekeeping activities are generally reactive in nature, they are sometimes referred to as reactive optimization. This involves detecting, investigating and resolving faults and other issues; for example, investigating equipment alarms that have inadvertently been dismissed by operations staff because no other symptoms were obvious. The aim of reactive optimization is to avoid lost revenue through performance failure and to maintain an operating baseline from which it is possible to address the true optimization activities. These are proactive in nature and are therefore referred to as proactive optimization. This type of optimization requires study, deliberation and careful design and involves modifying the configuration of the network (for example, adjusting sector parameters and site configuration) with the aim of driving the performance up from the baseline in order to achieve the greatest possible revenue. The above system facilitates both of these types of optimization and they are considered separately below.

Reactive optimization (also referred to as housekeeping) typically involves three phases: Problem detection; Problem diagnosis; and Solution deployment Without the above system, each of these phases can involve many manual steps. For example, optimization engineers have traditionally spent a lot of time running scripts and other procedures to extract and combine data from many systems and databases in order to be able to detect problems, before they even start to diagnose the causes and deploy solutions.

The above system speeds up the reactive optimization process by automating the detection and diagnosis of many problems and facilitating the sign-off of routine tasks and the investigation of the minority that require it. It is generally accepted that it is theoretically possible to automate the detection of 99% of network faults, the diagnosis of 80% of them and the deployment of a solution in 65% of cases.

Within the system, reactive optimization activities are handled as tasks. By default, when you open the system engineering client, it opens on a Task List, which lists and ranks the tasks for the current area in a "to do" list. This means that engineers no longer need to spend much of their time looking for problems and can instead concentrate on dealing with them. For many tasks, this simply involves accepting the automatically diagnosed solution.

Typically reactive optimization cycles are short and tend to involve one or a small group of sectors.

Proactive optimization is "true" network optimization. Unlike reactive optimization, which simply aims to maintain the status quo, proactive optimization aims to make adjustments to the design of the network in order to actually improve its performance. The present system facilitates proactive optimization by providing a rich suite of optimization and visualization tools and access to the network data in the database. The system provides a mechanism for embedding engineering best practice within the proactive optimization process while providing the flexibility for engineers to pursue their investigations in the ad hoc manner appropriate to the activity in hand.

Proactive optimization activities generally involve 30 or more sectors and include:

Performance benchmarking
  This involves a period when only reactive activities are carried out in order to get an accurate measure of network baseline performance such that it can be used to assess whether improvement has been made against a earlier/later performance benchmarking.
Benchmarking drive surveys
  These are frequently undertaken at the beginning and end of a project to carry out a before and after check. The system can schedule the drive test and generate a reactive task when the data becomes available.
Competitive drive surveys
  These are periodically undertaken as a means of comparing performance with other, competitive networks to determine whether deficiencies in own network performance exist.
Neighbor tuning
  This involves a holistic look at neighbor lists often using measurement programs. The system facilitates this by passing the necessary parameters to another tool.
Retuning
  This involves changing frequencies or scrambling codes (SCs) at the controller (or wider) level. This is undertaken periodically to take account of new sites and/or capacity demands. Insight facilitates this by passing the necessary parameters to another tool (such as AFP).
Frequency/SC planning
  This involves the local optimization of the frequency or SC plan. The system facilitates this by passing the necessary parameters to another tool.
Parameter trials
  These involve a trial of sets of parameters usually over several weeks and at the controller level. This activity can be performed within insight.
Ad hoc parameter changes
  This involves the setting of various parameters (including the allowed radio parameter set and neighbor relationships) on individual sites. This activity can be performed within the system.
Antenna changes
  This involves changes to the panning (orientation) and tilting of antennas or complete swaps. Most changes rely on little or no extra hardware cost (pre-approved budget); the optimization team typically runs a team of contracted riggers to do the work. The system facilitates this activity by passing the necessary parameters to another tool.
Site configuration
  This involves the installation of new hardware (such as an LNA) or antenna work such as raising the height of an antenna. These activities are normally tracked in a site build database and become a signoff task within Insight.

The system is not a replacement for network operators' existing systems—instead it uses the data from those systems. Typically the data is scattered in a plethora of different databases, sometimes on a per region basis. For example, the system handles the following broad categories of input data:

Network configuration data. This relates to the configuration and properties of the equipment (called network elements) in the physical network, such as the switches, controllers, sites, Base Transceiver Stations (BTSs), sectors, radios and antennas. Typically this data is extracted from planning tool database(s) and/or configuration management systems. When the data relates to multiple technologies (for example, 3G and 2G), the data for each technology may be extracted and loaded into the system separately. Although this data is preferably loaded into the system daily, its rate of change is typically fairly slow after the initial rollout phase. After loading into the system, this data is stored in the database as continuous values, which means that once a value is known, that value continues to be valid until it changes.

Performance data. These are counters and other statistics recorded on individual network elements (such as sectors or radios). Typically this data is extracted from an Operations and Support Systems (OSS) performance management (PM) tools tool. This data changes rapidly and each load is separate and independent. This data may be loaded into the system daily, but may instead be loaded more frequently, for example every 15 minutes.

Neighbor data. This defines the neighbor relationships between sectors and usually includes parameters that control the handover function as well as handover statistics. Typically each sector has a list of sectors that are potential handover targets. Each source-target pair is known as a tuple and has parameters that control it and performance counters that are maintained so that the network operator can monitor its performance. Typically the neighbor tuples and their parameters are extracted from a configuration management database and the performance counters from the performance management system. Like the other network configuration data, the neighbor configuration data generally changes fairly infrequently after the initial rollout phase. Therefore this data is generally loaded daily or less frequently.

Alarms. These are events that are detected in the network prior to loading into the system. For example, an alarm might correspond to a buzzer that sounded in the network control room when an intruder broke into a base station. These alarms are sometimes called equipment alarms to distinguish them from the performance and configuration alerts that are detected by the Rules Engine within the system. Equipment alarms relate to a network element (typically a site or sector) and typically include a description of the problem and possibly diagnostic information. Equipment alarms are stored in the database as events rather than attributes.

Site build data. This data comes from a "Site Build" database, which tracks the status of new and existing sites and includes upgrades to existing equipment such as capacity upgrades. For example, a "New Site" event might be triggered by the Rules Engine when a site's status changes to "Integration" in the Site Build database, indicating that a new site is coming online.

Drive test data. The system may also handle drive test data. Drive test data comprises data captures from a survey performed by driving a test mobile handset through a particular area and capturing the data transmitted between the mobile handset and the digital mobile phone network to analyze the network performance.

Trouble tickets. The system may also handle trouble tickets from an external trouble ticket system. Trouble tickets are a means to allow problems with the network to be logged and the progress of the solution to be tracked.

The above list is not an exhaustive list of data types. Other types of data will be known to those skilled in the art.

The types of data stored or used by the system break down into two main categories: discrete and continuous. This categorization affects how the data is stored in the database and which functions are used to retrieve the data from a data store.

Discrete data are values that represent a snapshot of an aspect of the network at a moment in time. For example, a discrete data might be a KPI (such as the number of dropped calls) for which every value has meaning, even when there are the same number of dropped calls for several days in a row.

Continuous data are values (such as a sector's tilt or beamwidth) that change infrequently. Once the value of a continuous attribute is known, that value continues to be valid until it changes. In order to conserve space within the database, values are stored only when they change.

Data is retrieved from the various sources and is stored in a Nexus database.

Figure 2A:
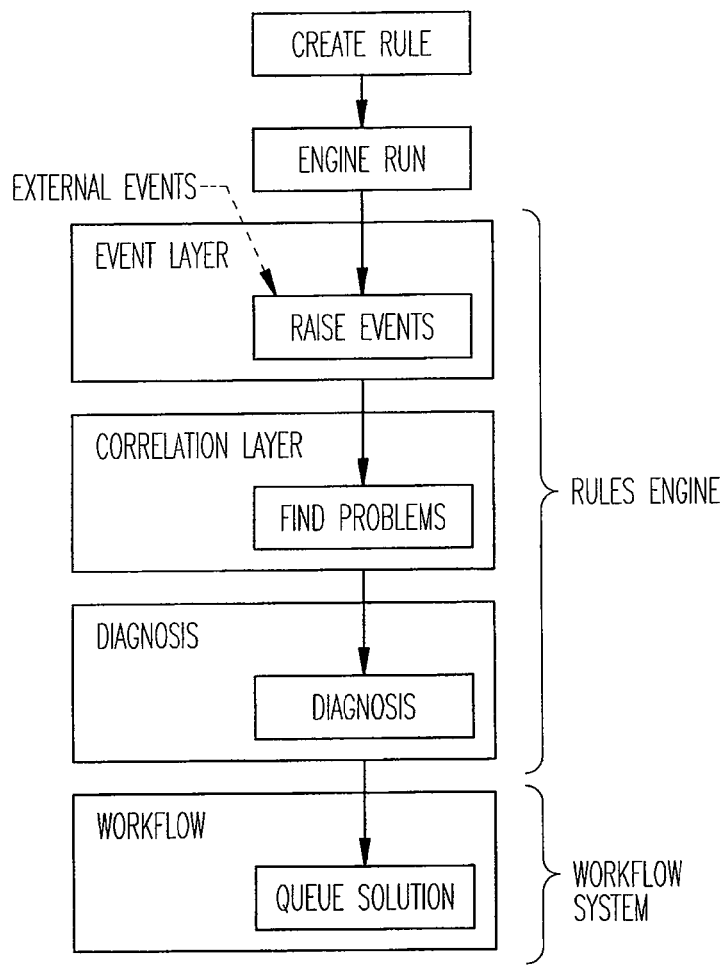
FIG. 2a shows the process of generating the task workflow.

FIG. 2a shows the processes behind the generation of the task workflow, which will now be described.

The rules engine, implemented as a Nexus Rules Engine, comprises a number of layers: an event layer, a correlation layer, and a diagnosis layer.

The Nexus Rules Engine applies special expressions (called rules) to the data in the Nexus database. The rules define the formulas and diagnoses that generate performance alert and other events and create the tasks that are shown for each engineer on his or her system display.

The rules define the performance and configuration alerts and other events on which the task is based. Generally, performance alert formulas are run against data in the Nexus database, for example OMC counter data (a record of the number of key events from the OMC, such as dropped calls, handover failures etc), configuration alert formulas against the configuration data in the same database, and externally generated events. For example, a performance alert formula might define upper and lower-bound thresholds for each counter that is being monitored. A counter might measure the number of Radio Resources Control (RRC) Active Connection Failures caused by the radio interface. The formula might then specify that a performance alert should be triggered when the counter value simply exceeds the upper-bound threshold. Externally generated events include, for example, equipment alarms that detect when an external piece of equipment is not performing correctly, cabinet door alarms for detecting when a cabinet door is left open, and other like alarms.

Figure 2B:
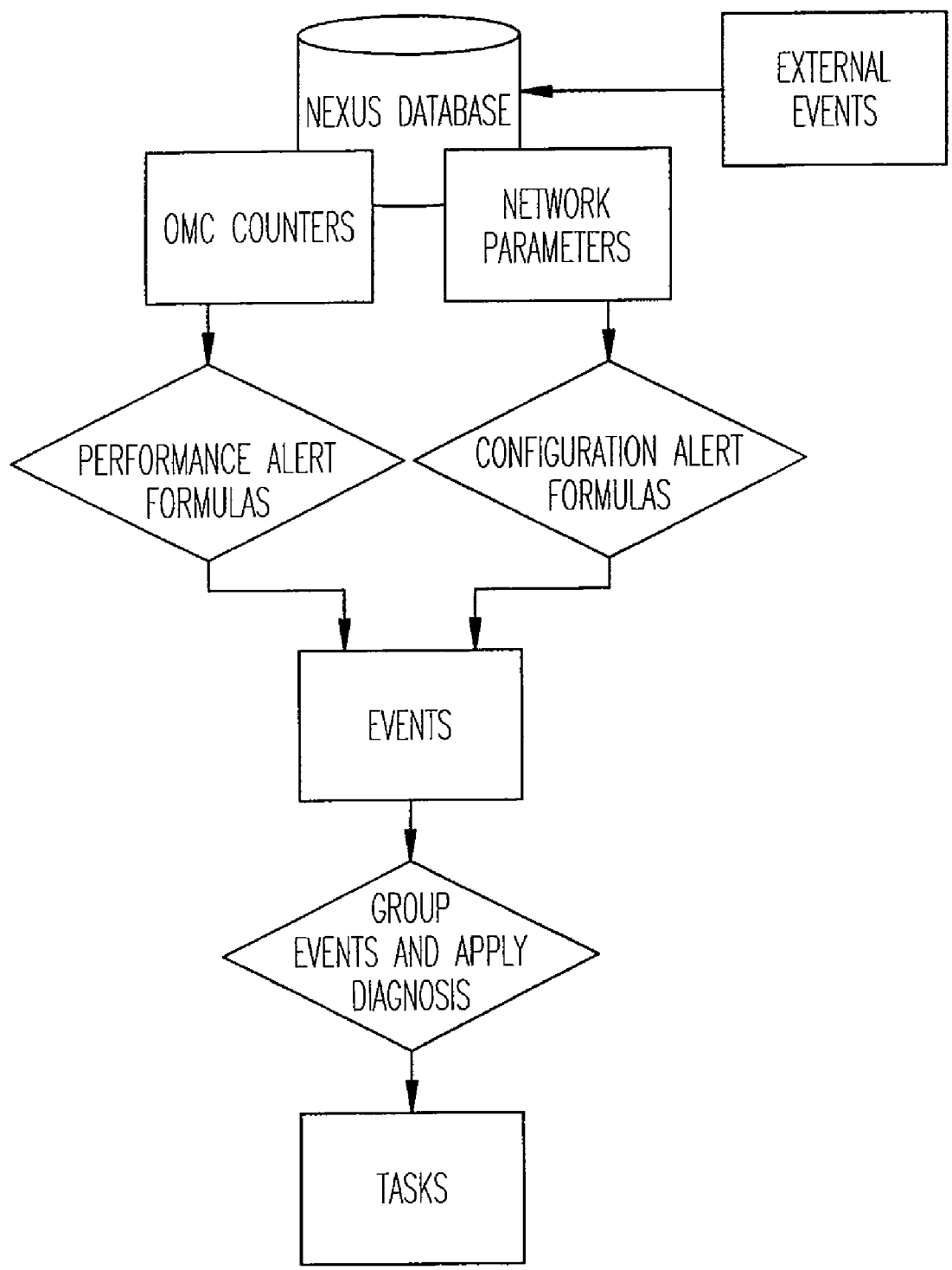
FIG. 2b shows a block diagram of the event generation.
Figure 2C:
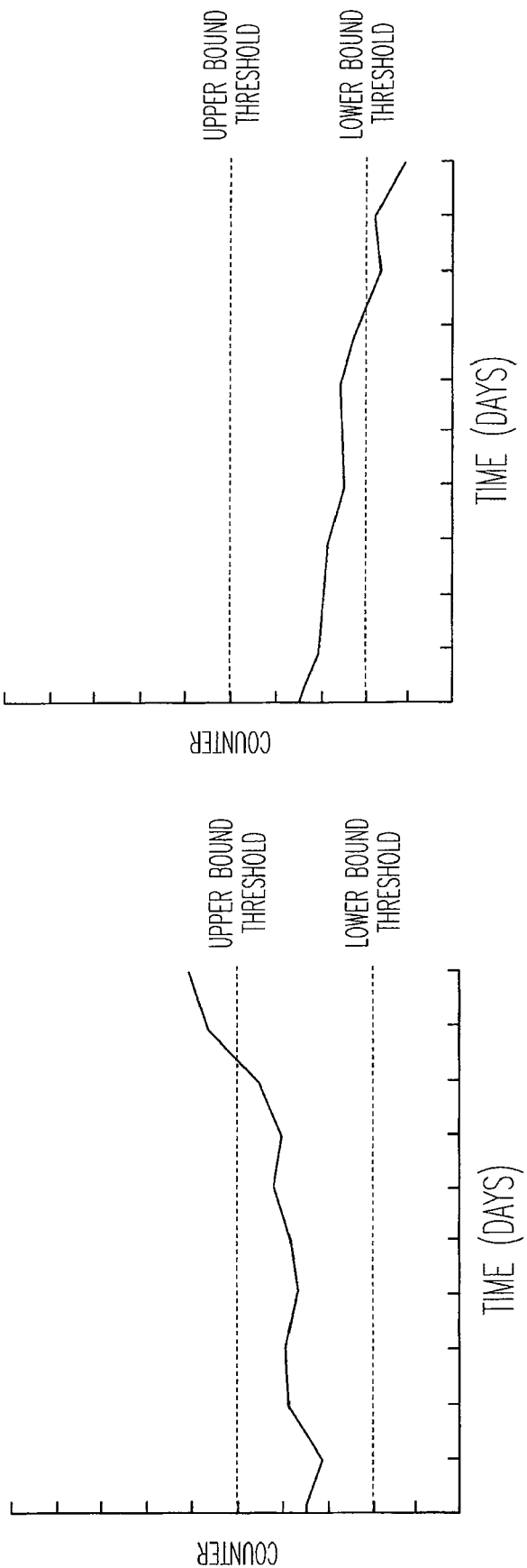
FIG. 2c illustrates example triggering thresholds for such alarms.

FIG. 2b shows a block diagram of the event generation and FIG. 2c illustrates example triggering thresholds for such alarms. Triggering from pre-set thresholds enables the system to filter out 'false-positive' alarms.

The rules may be more complex than the above examples. For example, a performance alert can be triggered only when the average counter value for the last seven days exceeds the upper threshold plus three times the standard deviation; or when the maximum value recorded over the last fourteen days multiplied by 120% exceeds the upper threshold, etc.

KPIs (key performance indicators) are measures that gauge the success of the network and enable network operators to look at the network from an overall perspective, track its performance and identify areas that need attention. For example, KPIs are often used to test whether the network is performing according to targets and goals. KPIs are generally calculated from the counter data. The formula for an RF Dropped Call Rate KPI might be:

$$RF\_Dropped\_Call\_Rate = (Drops\_RF / Call\_Setup\_Success\_RF) * 100$$

Where Drops_RF and Call_Setup_Success_RF are the counters for dropped calls and successful call setups, respectively. However, the exact definition might vary from operator to operator.

Generally, KPIs are generated by the system by the rules and are handled using calculated attributes. These are special attributes whose values are calculated on the fly from other attributes (typically OMC counters) using an expression that is stored as part of the attribute definition in the Nexus database. This means that it is possible to easily generate statistically valid KPIs for any combination of sectors, for example.

Each triggered alarm is associated with an event in the event layer of the rules engine. Effectively, the events identify changes in performance or changes in configuration of the network, or a combination of both.

Once the events have been identified, the rules group the events in the correlation layer to form a hierarchy of events. The lowest layer in the hierarchy of events comprises the above-mentioned detected events triggered from alarms and KPI threshold comparisons. Higher levels in the hierarchy comprise new events generated by the rules from grouped events from the lowest level. The rules group the lowest level events by identifying known problems associated with such a group of events. By grouping the events, the rules filter out the symptoms of a problem to identify the cause of the problem.

Figure 2D:
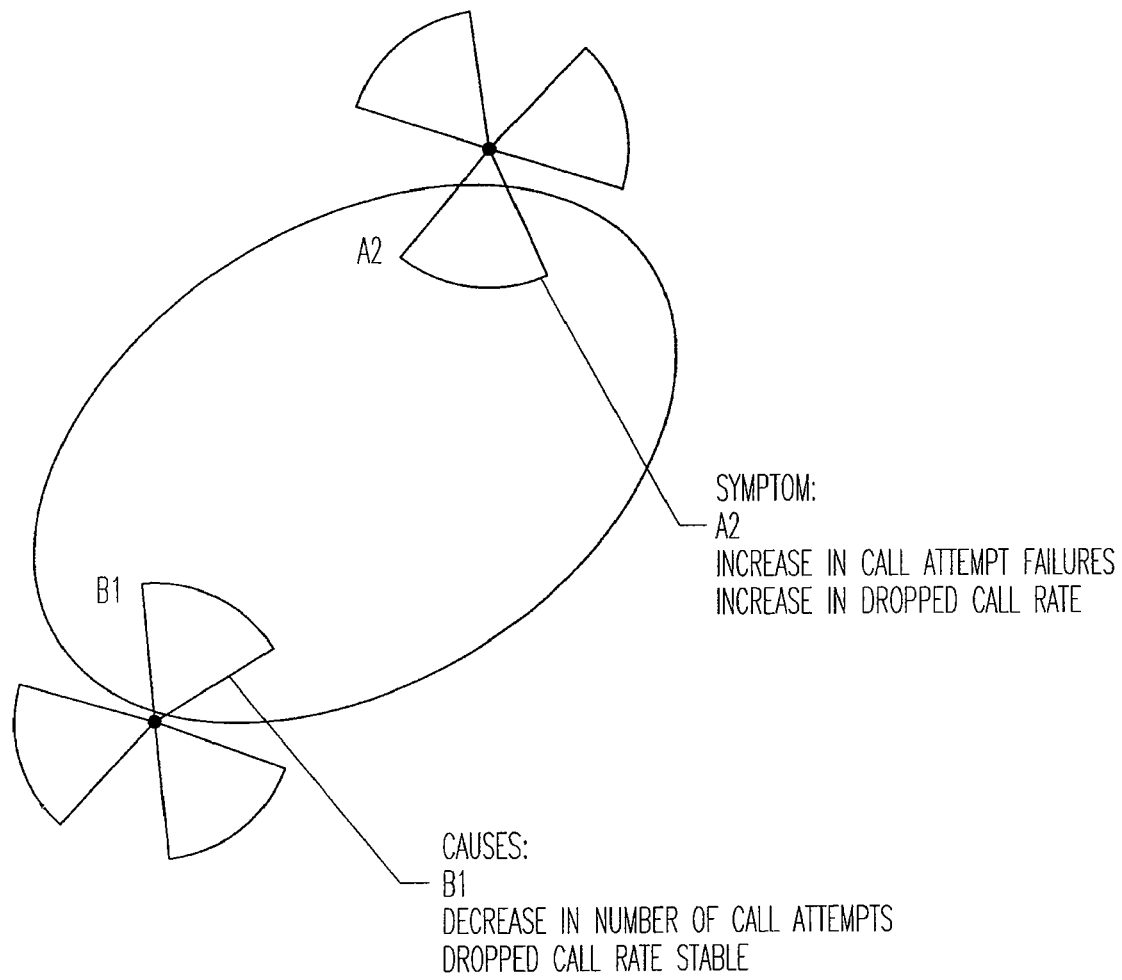
FIG. 2d shows an example event grouping.

See FIG. 2d for an example. Suppose sector 2 in site A is exhibiting an increased rate of dropped calls and call attempt failures. By looking at the events alone we would expect this to mean there is a problem with that sector. However, it is possible to create logic to compare the performance of the neighboring sectors to establish whether any of them are in fact causing the problem (for example, sector 1 on the neighboring site B might have a decreased number of call attempts and a stable dropped call rate, indicating that it is in fact the cause of the problem in sector A2). It is possible to create a rule to automatically detect this and generate a task that instructs the engineer to address the issue in sector B1.

The diagnostic layer comprises rules that apply diagnostic logic on the grouped event results from the correlation layer in order to create the engineering tasks. This could, for example, comprise the construction of a multi-dimensional array of fault signatures using events to diagnose known causes of known problems.

Once the diagnoses have been generated, the system identifies and creates one or more tasks to address the identified problems. Tasks are specific to a particular engineer or engineering team and are stacked in a queue. The queue is prioritized dependent on a number of factors, including the age of the problems, the volume of events triggered from a particular problem and other such schemes. For example, a larger volume of triggered events for a particular problem in the network will raise the priority of the associated task.

In their simplest form, the tasks themselves comprise a description of the suspected problem and a suggested diagnosis and an implementation of a solution. However, the system associates each of the tasks all of the underlying data used to generate that particular task. Therefore, when displaying a particular task, the engineer can view all of the data that was used in generating that particular task, which gives the engineer the context in which the task was generated, further aiding the engineer's implementation of the solution.

In general, KPIs are defined as scripts in the rules engine, which enables them to be applied to any number of elements within the system in a dynamic way to give a measure of performance on one or more levels of the system. As such, KPIs can be generated to evaluate the impact of a problem over not just one element, but over an area. For example, KPIs could also be generated at the BTS, controller and area level and the results aggregated to determine the performance of the network at each particular level.

We will now describe various implementations of the above system.

Figure 3:
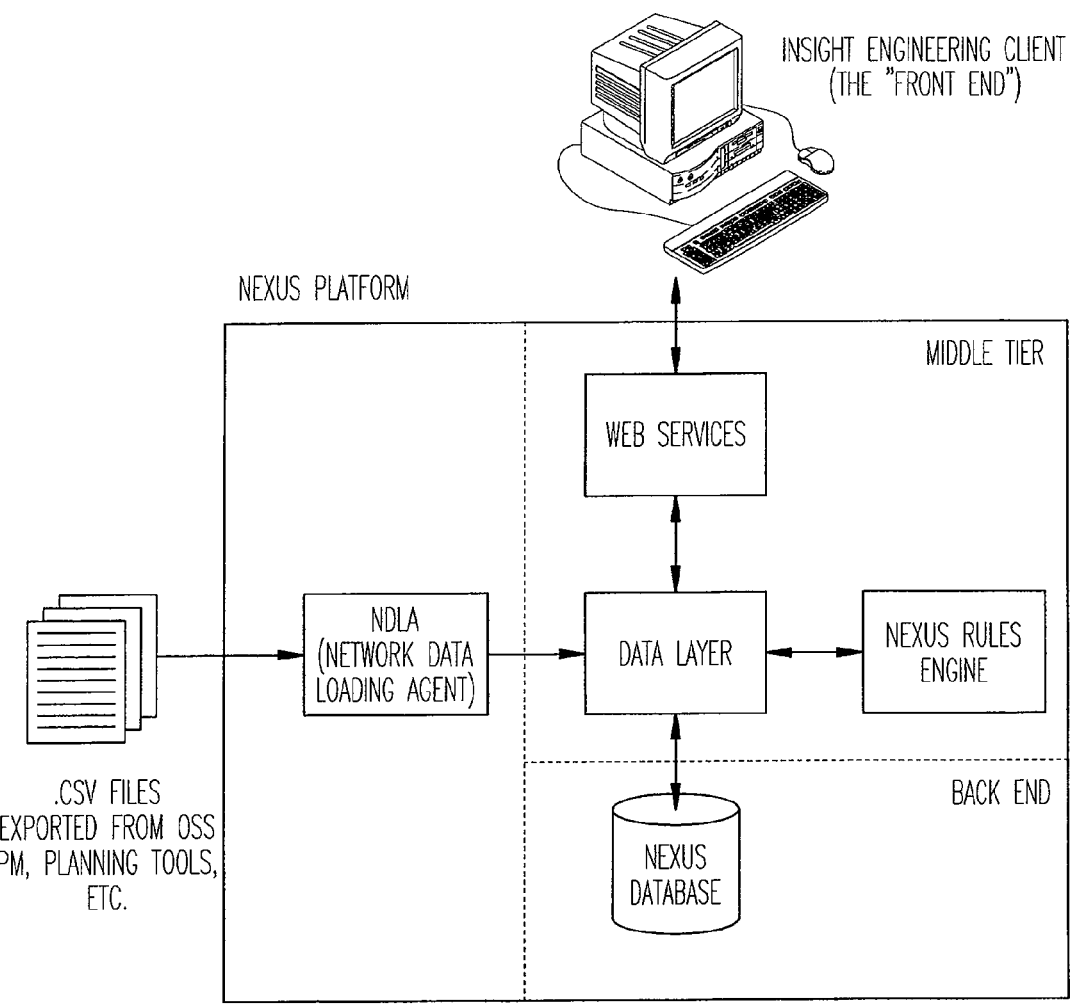
FIG. 3 shows a logical architecture of the system according to the present invention.

FIG. 3 shows a logical architecture of the system according to the present invention.

The architecture comprises a data repository (called the Nexus database) that may for example be implemented in Oracle running on a Linux server. The database stores data from a variety of different sources, including counter data. This data is collected by the network, usually by the OMC. Network operators use a variety of different systems to handle their counter data. These systems are called Operations and Support Systems (OSS) performance management (PM) tools and typical examples are Metrica Performance Manager and MYCOM. The present system may receive summary data from the OSS PM (typically overnight). Usually this output will be in a comma separated variable (.csv) format.

The Network Data Loading Agent (NDLA) loads the output from the OSS PM tool into the Nexus database. The data is stored in the database in such a way that KPI (key performance indicator) statistics can be retrieved for a specified period (for example, the last 30, 60, or 90 days).

The Nexus database also stores network configuration data, which records the location (latitude, longitude, height, etc.) and configuration (beamwidth, azimuth, etc.) of the base stations, the lists of neighboring sectors, etc. This data is generally exported from the network operator's network and neighbor planning tools in a comma-separated or similar format, and is then loaded into the database by the NDLA. Just like the counter data, changes are stored over time, so that changes in the KPIs can be correlated with changes to the network configuration. For example, users can compare KPIs based on counter data collected before and after a cell's azimuth was changed, etc.

The middle tier is a layer between the Nexus database at the back and the engineering client at the front. It caches information to improve the performance of the system and consists of the following:

A Web service-based API, which handles all of the communication between the engineering client and the database. Web services are a standard technology for exchanging information between computer systems across intranets and the Internet with support for end-to-end security.

A data layer, which provides standardized access to, and presentation of, the data in the database, regardless of its underlying structure.

The Nexus Rules Engine, which applies logic based on defined rules to the data in the database. The logic is defined in an expression language, such as AXEL.

Together the middle layer and the loading and back-end components are known as the Nexus platform, which is an enterprise platform that provides a high quality and scalable service for handling large volumes of data.

Figure 4A:
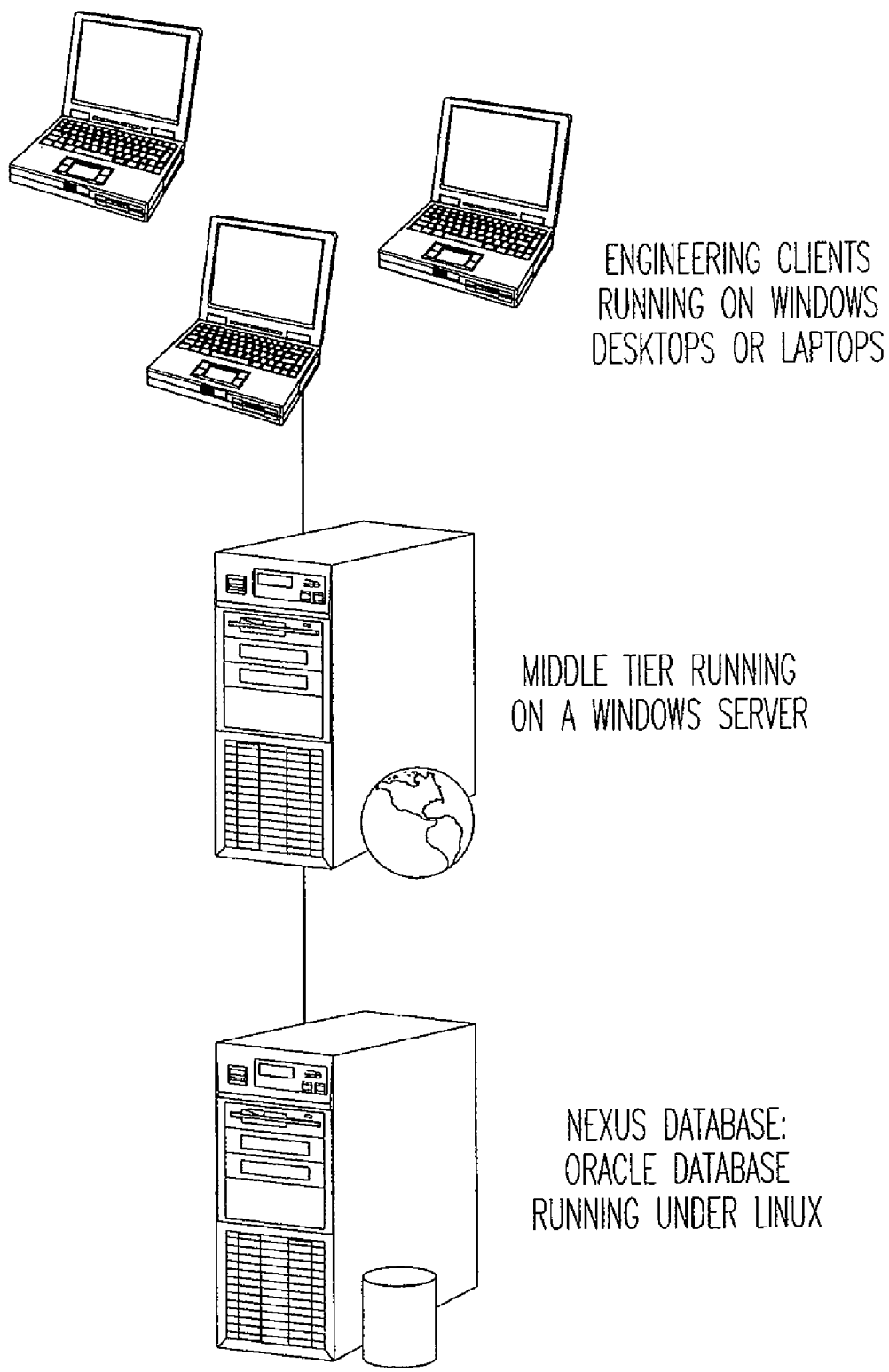
FIGS. 4a and 4b show two potential hardware configurations of the system.
Figure 4B:
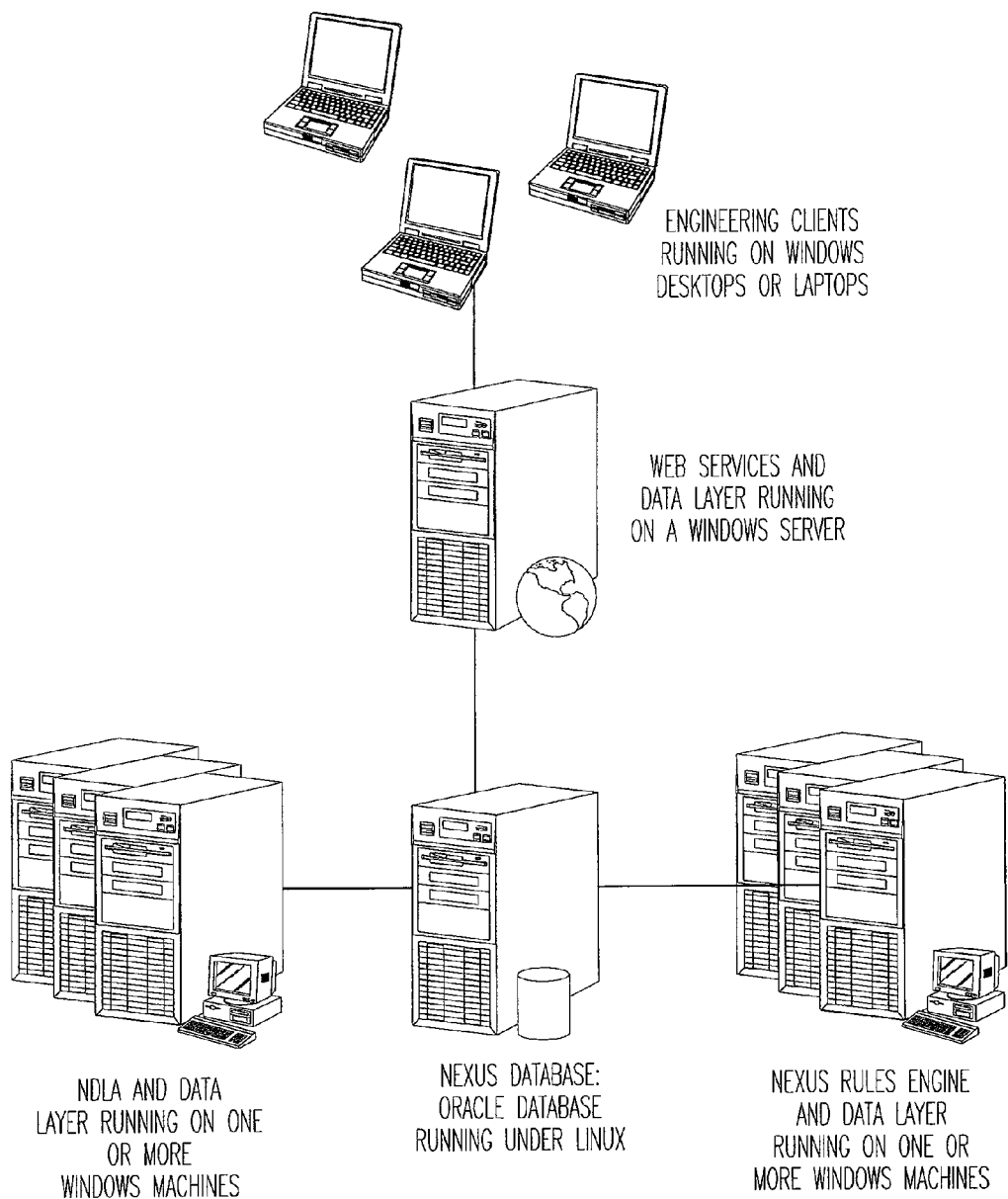

FIGS. 4a and 4b show two potential hardware configurations of the system. These provide examples of how the system and the Nexus platform can be scaled to meet the requirements of organizations of a wide variety of sizes.

FIG. 4a shows the Nexus database being connected to the middle tier, which is running, for example, on a separate Windows server. The engineering clients are shown connected to the middle tier and running on Windows desktop or laptop computers.

FIG. 4b shows the Nexus database being connected to first to a NDLA and Data layer running on one or more Windows machines, and secondly to a Nexus Rules Engine and Data Layer running on one or more Windows machines. The Nexus database is also connected to a Web services and Data layer running on a Windows server, to which the engineering clients connect, again running on Windows desktop or laptop computers.

We shall now look at the network components in more detail in turn.

The Nexus database is the data repository. It is a standard relational database and may, for example, be implemented in Oracle. The database contains a number of tables that store the data. Other components of the system do not access the database tables directly. Instead they communicate with the database using stored procedures, in order that they are insulated from any changes to the database schema that might be required over time.

In fact the other components do not call the stored procedures directly. Instead they call the middle tier's data layer, which in turn calls the stored procedures. This is designed to insulate all of the other components from the database implementation details and provides an infrastructure that is capable of handling multiple database implementations. This means, for example, that if support for a different database technology is introduced, only the data layer will need to be updated.

Stored procedures provide an API to the Nexus database. The API includes separate functions for each of the components of the system (NDLA, Admin Client, Engineering Client, Drive Test Loading Agent, Reporting Client). Because the data is sent to the client applications through the Web service, it is important for performance reasons that only relevant data is sent.

Data is loaded into the database in batches and is stored temporarily in two staging tables prior to being moved into the appropriate tables (depending on whether the values are discrete or continuous) for long-term storage. All data is stamped with the load event ID, which means that when necessary a batch load can be rolled back (undone).

Figure 5A:
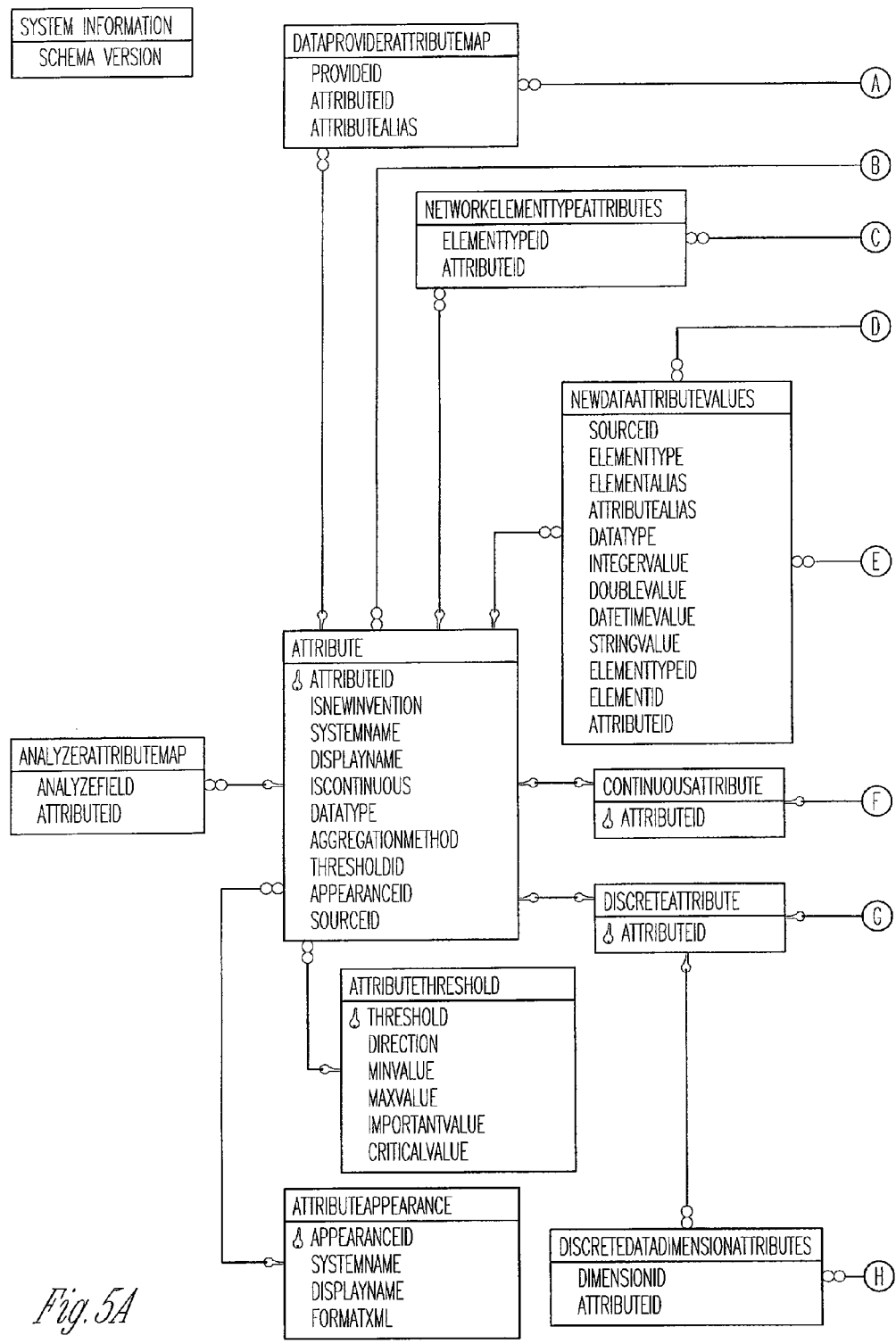
FIG. 5 shows a graphical representation of the tables within the database schema.
Figure 5B:
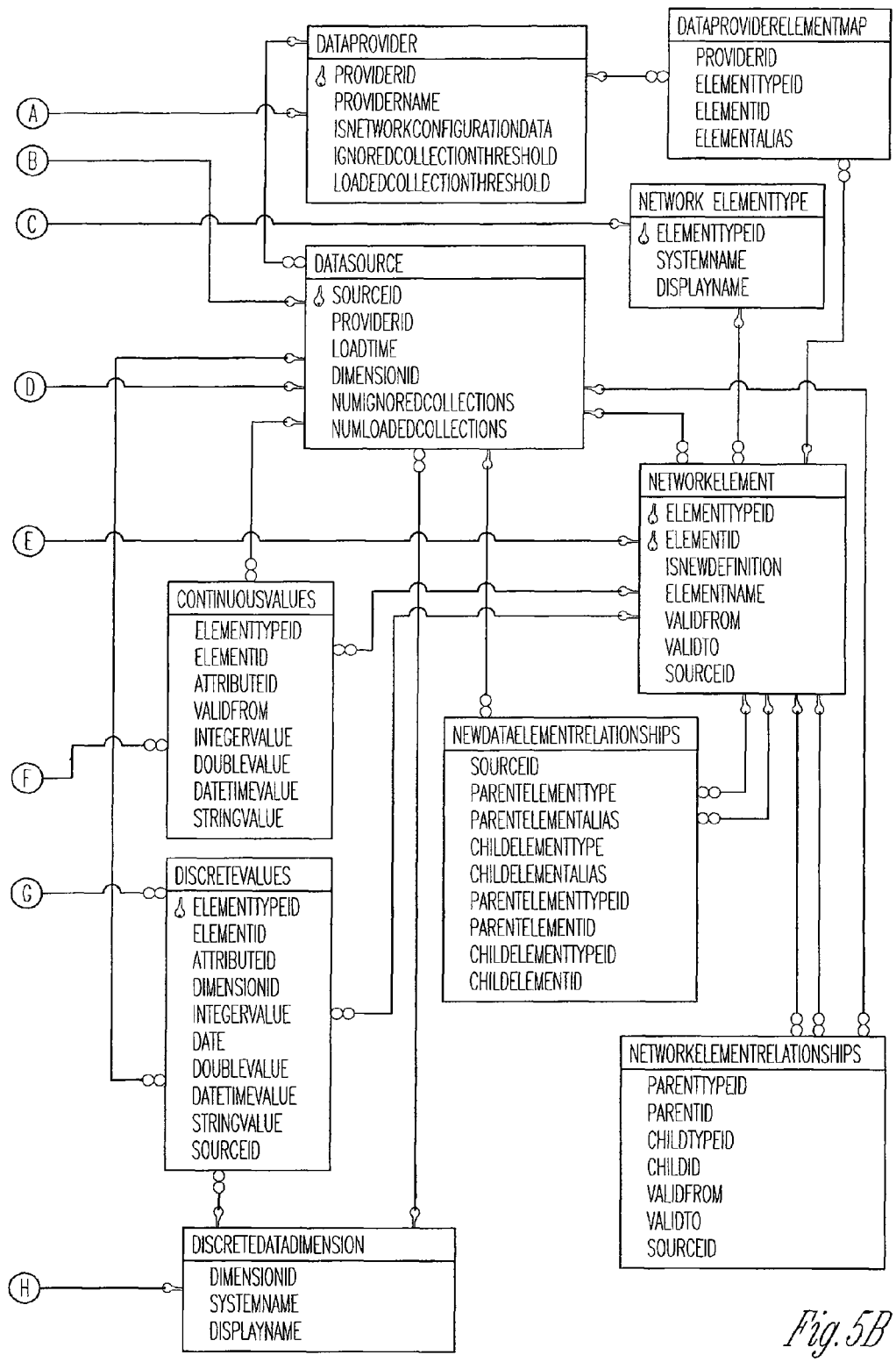
Figure 5C:
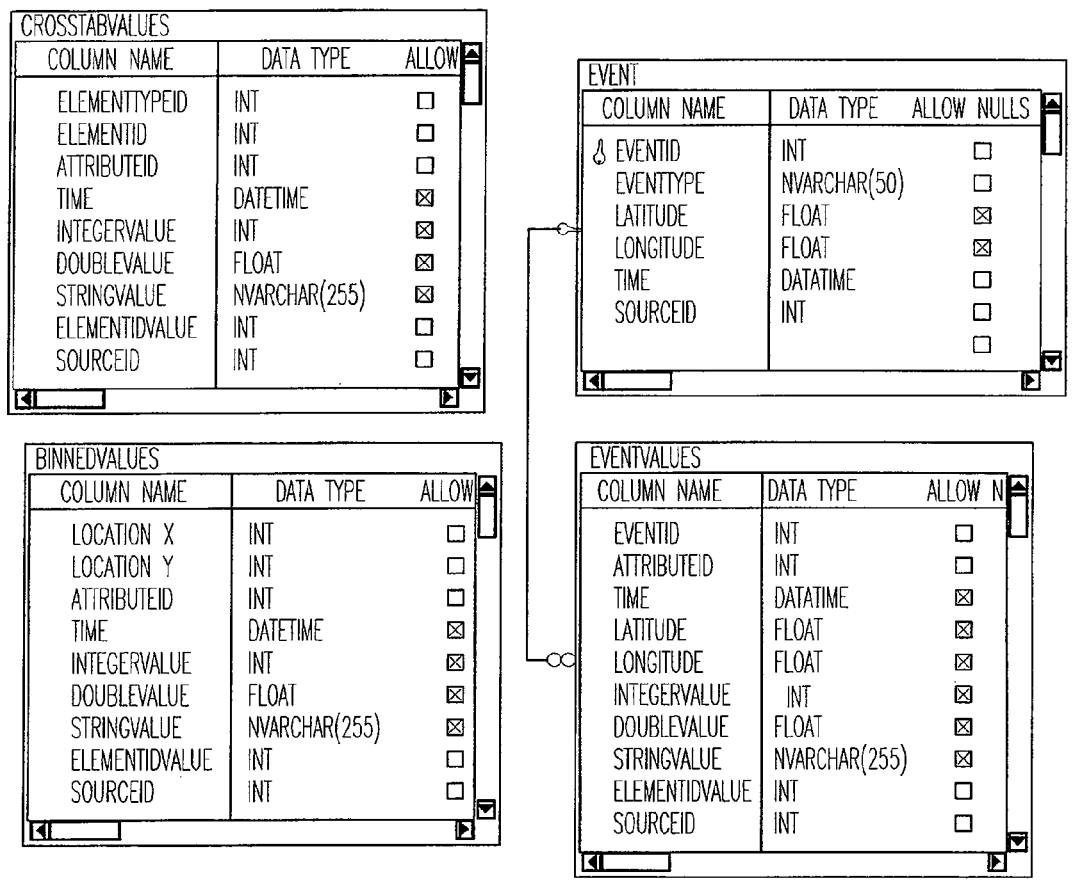

FIG. 5 shows a graphical representation of the tables within the database schema.

Figure 6:
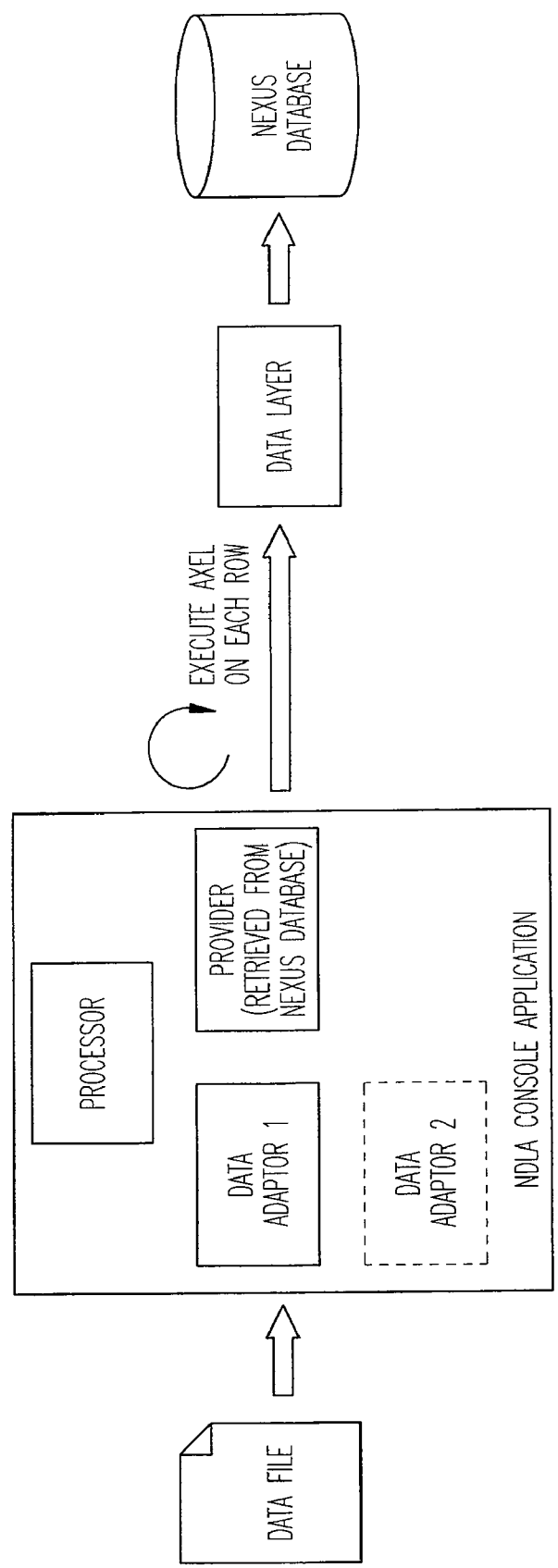
FIG. 6 shows the Network Data Loading Agent (NDLA)

FIG. 6 shows the Network Data Loading Agent (NDLA). The NDLA loads data into the Nexus database and is based around the following components:

File Monitor. This is a Windows Service that monitors one or more folders for new files that are ready for loading. When the File Monitor detects a new file in one of the monitored locations, the File Monitor checks the file's read-write status and when it becomes writable (which indicates that it has been released by the application that is writing it), the File Monitor activates the console application and passes it the names of the file and the provider for data files in that location.

Console Application. This is a Command line application that has two compulsory arguments and additional optional ones. The compulsory arguments specify the names of the data file to be loaded and the provider to be used. At run time, the application fires a processor, which retrieves the named provider from the database, fires up the data adaptor of the appropriate type (.csv, fixed width, etc.), iterates the rows in the data file, running on each field the AXEL statement specified in the provider. The console application also logs progress, reports any errors and emails them to the administrator.

Providers. These are specific to a particular type of data (for example, company ABC's 3G network configuration data in .csv format) and describe how it is to be handled. For example, the provider specifies the adaptor to be used, how the date and time are to be generated, the field separator if relevant, the names of the fields in the input file, whether they are to be ignored and if not their data type, the name of the corresponding attribute in the database, how it is to be validated, etc. The handling of each field is specified using an AXEL statement. The data providers must be configured for every type of data that is to be loaded and stored in the Nexus database.

Data Adaptors. These are specific to a particular data format (.csv, fixed width, or XML) and read and parse data of that format.

Data Layer. Part of the Middle Tier, this provides a standardized way of communicating with the database.

When the NDLA console application is fired, the following occurs:
    The NDLA console application is fired with the name of a data file and its provider.
    The NDLA processor gets the named provider from the database.
    The NDLA processor fires the adaptor specified in the provider and passes to it the named data file.
    The adaptor returns to the provider the column headings found in the data file.
    The adaptor iterates the rows in the data file. For each field in each row, the NDLA processor runs the AXEL specified for that field in the provider and builds up a staging table of data to be inserted into the database.
    The NDLA processor initiates a bulk insert of the staging table into the database via the data layer.

Figure 7:
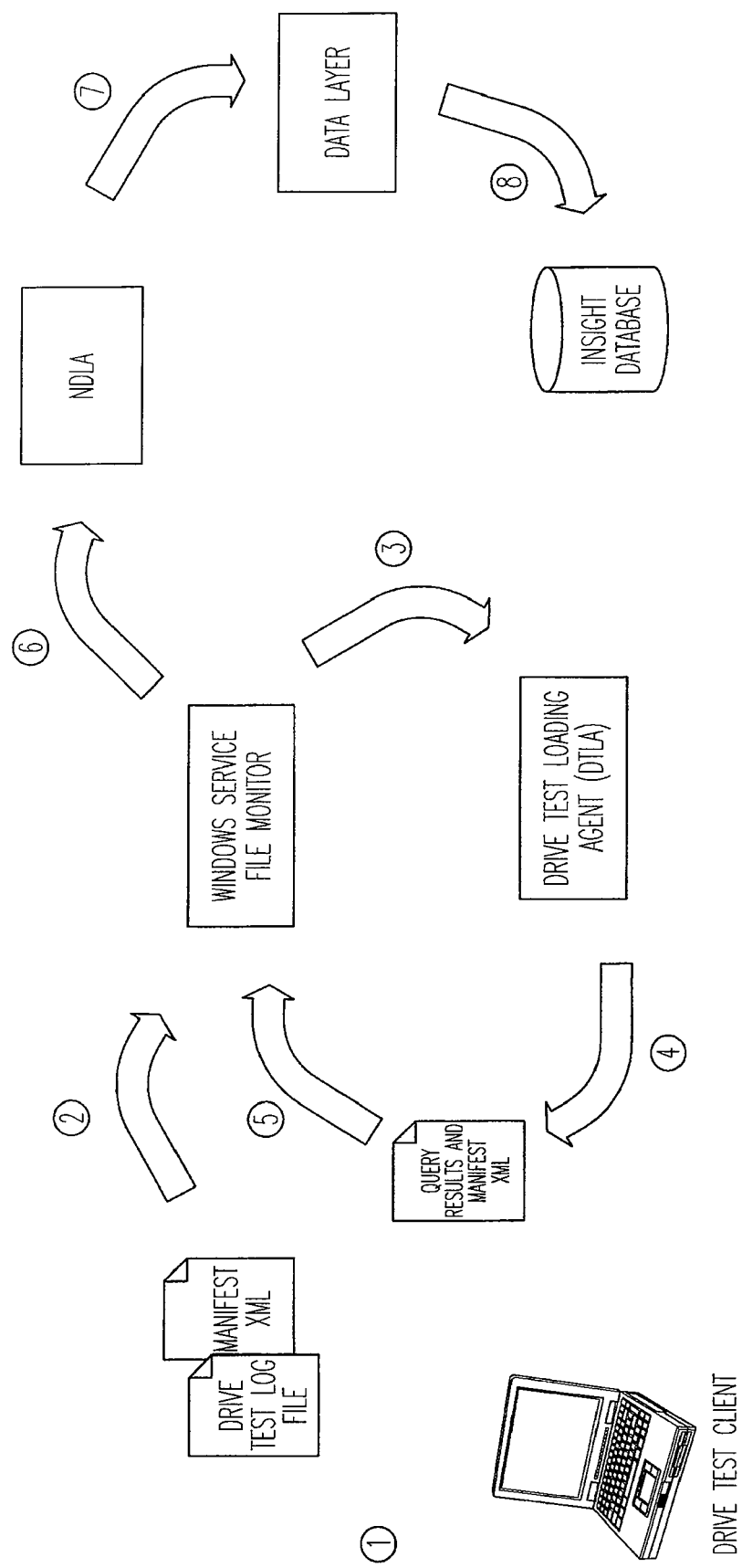
FIG. 7 shows the Drive Test Loading Agent (DTLA)

FIG. 7 shows the Drive Test Loading Agent (DTLA). The DTLA provides a mechanism for loading drive test log files into the system.

From the end user's point of view, all he or she has to do is to use the Drive Test Client to select the drive test log files that are to be loaded and to enter details about them, such as a description, the date and time of the drive, the engineer's name, the weather conditions, etc.

The Drive Test Client encapsulates the descriptive information into an XML file called the manifest.

The Drive Test Client then copies the log file and its related manifest into a file location that is being monitored by the File Monitor Windows service, which is part of the Network Data Loading Agent (NDLA). However, instead of firing the NDLA, the File Monitor is configured to fire the DTLA when a new log file and XML manifest pair become available.

For each log file and XML manifest pair of files, the DTLA does the following:
    Extracts the drive test dates from the XML manifest and retrieves the relevant site and sector information for those dates from the Nexus database.
    Exports the site and sector information in the form of an Analyzer CellRefs file and sets this as the current CellRefs file.
    Instantiates the FSD component and loads the crosstab queries that are to be used to summarize the data.
    Loads the log file into the FSD.
    When the file load is complete, the DTLA "runs" the specified crosstab queries and retrieves the resulting datasets.
    Exports the query results and the manifest into an XML file, which is then dropped into a folder that is watched by the NDLA's File Monitor.

The exported file is then loaded into the Nexus database by the NDLA in the normal way. This requires that the File Monitor is configured to watch the folder where the DTLA drops the exported files and that a suitable data adaptor is available.

The middle tier is part of the Nexus platform and consists of a thin layer between the Nexus database and the engineering client. The middle tier includes a Web service-based application programming interface (API) and all communication between the engineering client and the database is handled by this API.

Behind the Web service is a data layer, which has two main roles:

It handles all of the communication with the database.

It provides standardized access to, and presentation of, the data regardless of the structure of the underlying database.

Figure 8A:
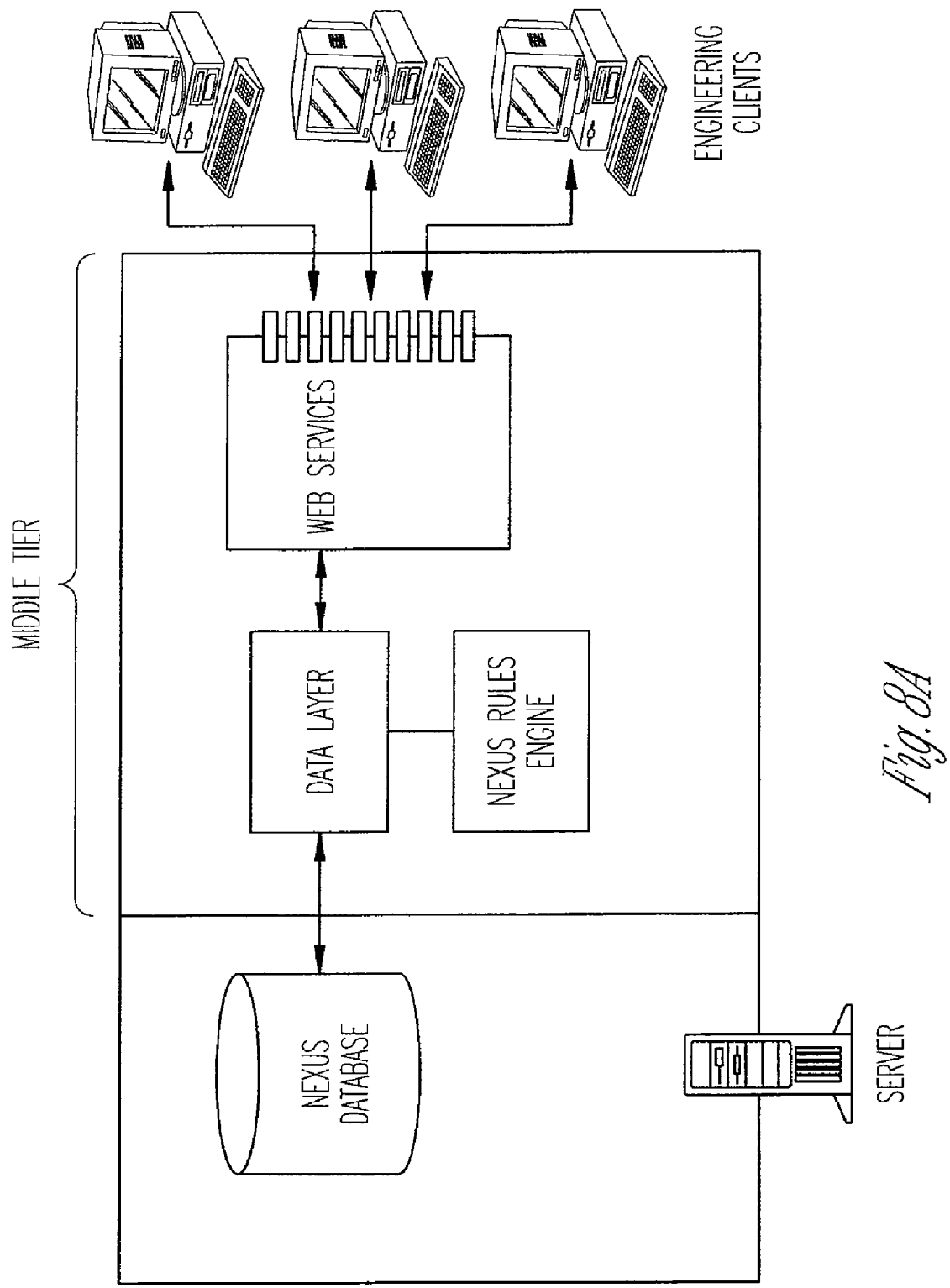

FIG. 8a shows the middle tier of the Nexus platform.

To illustrate how it works, let's consider what happens when the engineering client requires a list of sites and their KPIs:

The engineering client uses the middle tier's Web service API to request the list.

The Web service requests the list from the data layer.

The data layer retrieves the data from the database, presents it in a standard form and passes this to the Web service.

The Web service returns the data to the engineering client.

This architecture has several advantages. For example:

Independence from database implementation. The engineering client and other front-end applications are completely insulated from the database implementation. This means that the front-end applications will not need to change should it be necessary to add new database implementations. Nexus currently uses an Oracle database running under Linux. Other implementations could be envisaged by the skilled reader.

Easier deployment. Interactions with the database typically require various libraries to be installed on the local machine. Because the data layer handles all communication with the database, these libraries need to be installed on the server hosting the data layer only (rather than on every engineering client machine, for example). The data layer can be hosted on one or more different servers from the database itself.

Database licensing advantages. Because all connections to the database are made through the data layer, this architecture would have significant advantages should the database server application be licensed on a per-connection basis.

The middle tier may also cache data. For example, it might build a model of the user's mobile telecoms network, which would improved the performance of the engineering client and allows the whole system to be more scaleable.

Finally, the middle tier provides a potential home for the logic. Separating the logic from the data and the user interface is good practice and means that the engineering client can be leaner and thinner than would otherwise be necessary.

FIG. 8b shows an alternative implementation of the middle tier, which supports third-party clients. These would use the Web service API to communicate with the database, just as the engineering client does. Support for third-party clients would require a mechanism for authenticating clients who use the API. Similarly other systems are able to interact with the system, such as AFP and ACP, or other databases that hold sector-based KPIs.

To the user, the engineering client is the task and map-based tool that he or she uses everyday.

Figure 9A:
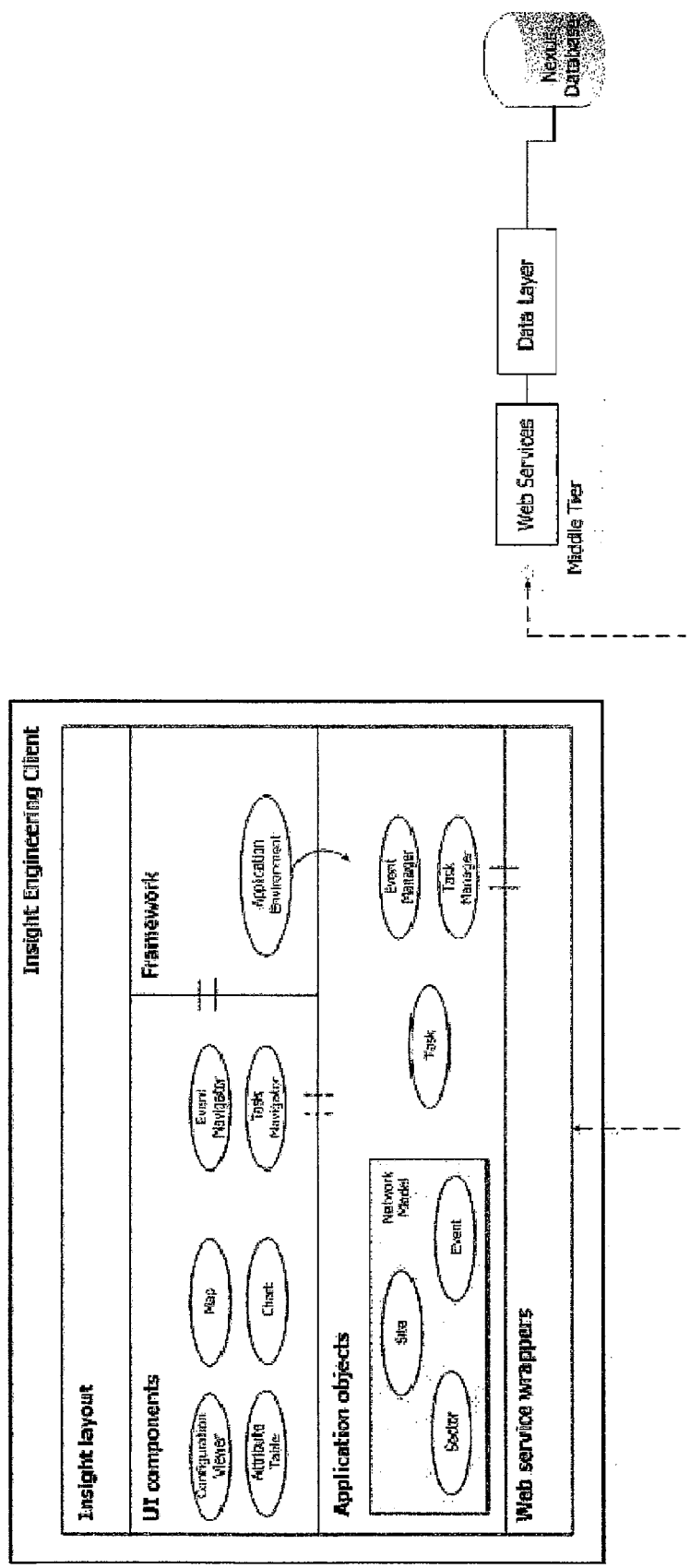
FIG. 9a provides a conceptual view of the engineering client's architecture.

The engineering client is a Windows .NET forms application. FIG. 9a provides a conceptual view of the engineering client's architecture.

All communication between the engineering client and the database takes place through the middle tier's Web services, which provide a collection of methods for accessing the data across intranets and the Internet. However, the communication is handled by the engineering client's Web service wrappers. None of the other components within the engineering client communicate with the Web services directly. This design makes it easy to set up unit tests to test the various components within the engineering client, because it is possible to substitute a "mock" object in place of the real Web services. This means that the components can be unit tested in an isolated environment, without all of the complications, dependencies and unknowns that are introduced when they are part of a complex system and data is being transmitted across the network. Each unit test sets up its own data within the mock object and use that within the testing of the component.

The application objects, also known as business objects, are the logical building blocks of the engineering client. Some, such as the Network Model, Site, Sector, Event, and Task objects map to basic concepts within Insight and others, such as the Event Manager and Task Manager, control and manipulate the basic objects. For example, the Event Manager is responsible for retrieving the list of events and does this through the Web service wrappers. The Network Model is an object model representation that models the user's mobile telecoms network configuration. The Site, Sector, and Event objects are part of the Network Model and are always accessed through it.

On top of the Application objects are the UI components, such as the Attribute Table, Configuration Viewer, Event Navigator, Task Navigator, Map, Chart, etc. As their names suggest, these correspond to the various elements that you see on the screen in the engineering client and they interact with the application objects. For example, the Event Navigator UI component corresponds to the Event Log that you see on the screen and it interacts with the Event Manager object, which (as explained earlier) actually gets the events that are displayed.

The Map object corresponds to the map that you see on the screen. The system draws the standard map layers and then draws other layers on top. The upper layers allow additional information to be displayed.

Figure 9B:
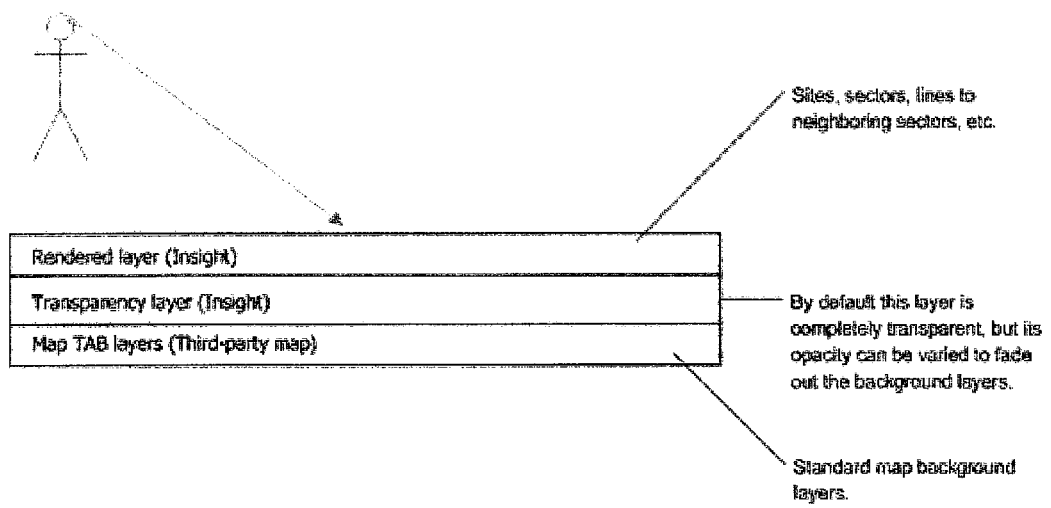
FIG. 9b shows the layered maps of the engineering client.

FIG. 9b shows the layered maps of the engineering client.

The Map object draws two system-specific layers:

Transparency layer. This is drawn immediately above the standard map background layers and by default it is completely transparent. By changing its opacity, the background layers can be faded out.

Rendered layer. This is the topmost layer and it is used to draw the sites, sectors, lines to neighboring cells and other system-specific data.

The UI components communicate through the Application Environment object, which is the central manager of the engineering client framework—it handles the communication between the various UI components and handles their state. For example, the Application Environment object tracks which area, task, date, etc. is currently selected. When the user selects a different area, for example, the Application Environment object raises a "current area changed" .NET event. When the UI components detect this event, they update their displays accordingly.

On top of the UI components and the framework is the System Layout, which controls how the various UI components are arranged on the screen. Internally the System Layout is a container of .NET forms and it has a small amount of logic to handle what happens when you open the client for an area for which there are no tasks, for example. (Instead of opening on an empty Task List, it goes straight to the Explore Area tabs.)

The current selection represents what the user is currently dealing with. For example, it might be a single site or sector, a group of sites, or an area on the map that includes a number of different sites. It is the framework's responsibility to track the current selection and to communicate it to the map and plug-ins, so that when the user selects something else, they can reflect this on the screen.

The framework always contains the map, but the plug-ins might vary, depending on the context. Currently the context simply defines how the map and the plug-ins are arranged on the screen. For example, there might be a context called KPI Navigator, which specifies that the screen should be arranged as shown in the following diagram.

Figure 9C:
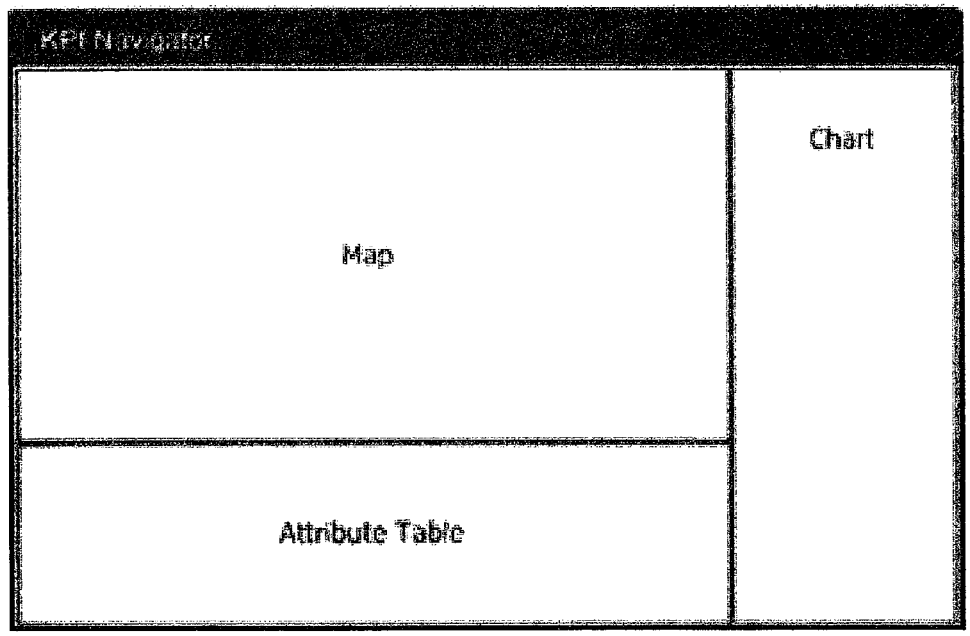
FIG. 9c shows an example layout displayed by the engineering client.

FIG. 9c shows an example layout displayed by the engineering client.

The context may be extended to specify which attributes are relevant to the context. For example, a Neighbor List Tuning context might specify not only the plug-ins to be used and how they are arranged on the screen, but also a list of attributes that are relevant when users are configuring neighbor lists.

We shall now discuss the rules in more detail.

As explained above, the Nexus Rules Engine applies expressions called rules to the data in the Nexus database. For example, rules are used to create performance and configuration alerts and group them into reactive tasks, which then appear on the Task List in the engineering client. The present system uses an expression language called AXEL and are run in the Engine context, which provides access to the KPIs and the attributes in the Nexus database and a number of useful functions for raising events, creating tasks, finding network elements, etc.

The Nexus Rules Engine is extremely flexible and does not control what the rules are run against. Instead this is defined in the rules themselves. Although within the AXEL terminology, each rule is a separate expression, you can think of each rule as a script and it is up to the person creating it to define its flow. For example, it is possible to write a rule that specifies that it is to be run against the data for one particular sector only. However, it is more common to create rules that are run against all of the sectors in a particular area, or all of the sectors in all of the reactive optimization areas, or against all of the base stations that are connected to a particular OMC, say. This flexibility means that you could, for example, create one set of rules for use in dense urban areas and another set for use in a sparsely-populated rural areas, etc.

An example rule that is, for example, designed to be run daily for all of the reactive optimization areas is described as follows. The rule loops through every sector in each of the areas performing checks on a number of KPIs and raising performance alerts for any sectors that fail the checks. The checks might consist of delta checks, which look for changes in performance by comparing the current value with, for example, the average value over the previous three weeks. Alternatively the checks might simply compare the current value with a fixed threshold (these are called threshold checks). Delta check rules tend to involve heavier processing than rules that simply check performance against fixed thresholds.

If any performance alerts are generated for a sector, additional checks are performed on key radio statistics, which might result in the generation of further performance alerts. All of the alerts that are generated for a sector are then wrapped up into a single task. This avoids the traditional duplication that occurs when one task list is based on the top 10 sectors with the worst dropped call rate and another on the top 10 sectors with the worst call setup success rate, because frequently both problems have the same or a related root cause and so many of the same sectors appear on both lists. By creating a task for each sector that has a performance issue in any of these related areas, the engineer has all of the pertinent information available as soon as he or she opens up the task. In addition, some criteria, such as traffic statistics, can be used to generate a task priority, so that the sectors with the highest traffic are flagged up with the highest priority.

Checking the radio statistics only for sectors that have failed the sector-level checks makes the rule faster to run than checking the radio statistics for every sector. This is a useful technique in delta check rules that are run against very large volumes of data. However, the flexibility that is inherent in the Nexus Rules Engine means that these and similar choices are in the hand of the creator of the rules. There is sometimes a trade-off between picking up so many potential issues that your engineers do not have time to investigate them all and attempting to pick out only the most important issues at the risk of missing some. The rules can be tailored to meet the requirements of your network and to fit the hardware and other resources that are available. In addition, you can refine them in response to experience.

Rules that are designed to be run against a large amount of data are generally scheduled to be run overnight, with perhaps the performance alert rules being run every night and the configuration alert rules once or twice a week. But again the flexibility of the Nexus platform means that the frequency can be set to meet specific user requirements.

It is generally helpful to group rules into logical categories. Typically rules perform a number of checks on the data and raise events when the checks fail. Currently rules that generate events generally also generate tasks. They can do this in different ways. For example, a daily performance check rule might create a single task for every sector that fails any of the checks, and wrap up all of the events that are generated for the sector into that single task. This has the advantage that it avoids duplication and keeps all of the performance information for each sector that exhibits an issue together in a single task. A configuration check rule, on the other hand, might do something similar for each area rather than for each sector. However, it is also possible to group events into tasks in other ways or to create a separate task for each event.

Rules typically fall into the following logical groups:

Configuration check rules perform checks on network configuration data (also called planning data), which is stored in continuous attributes. Typically there are two types of configuration check rules:

Delta checks. These look for changes in the configuration and typically raise configuration alert events when significant changes are found. Typical changes might be new or deleted network elements, changes of configuration parameters, such as a new antenna mask, for example.

Audit checks. These compare the network configuration with the default or designed configuration and typically raise configuration alert events when discrepancies are found. For example, a rule of this type might check that sectors do not have more than a specified number of 2G neighbors and raise a configuration alert for any that do.

Performance check rules perform tests on network performance data, either by looking at the raw counters stored in discrete attributes or by looking at the KPIs that are generated from those counters. The flexibility of the Nexus Rules Engine is such that there is considerable scope for innovation in how you can implement performance check rules. However, typically performance check rules look at a set of KPIs that cover the service as a whole, using the industry standard approach of accessibility, retention, voice quality and capacity, with the addition of further checks that aim to provide additional information to enable diagnosis and prioritization of issues.

For example a common approach is the following:

High-level checks. Test the high-level KPIs that cover the key areas of accessibility, retention and voice quality. The important issue here is to identify the right high-level tests.

Additional analysis. If any of the high-level tests fail, perform additional tests on the underlying KPIs that can be expected to provide further analysis of the high-level issues.

Diagnosis. Use the additional tests to build up a matrix of information, which can then be searched for fault signatures and a potential diagnosis.

Set priority. Assign a priority value that reflects the overall importance of the issues that have been identified whilst taking into account any other relevant information. For example, the overall traffic on the associated network element might contribute to the priority, because elements with high traffic are generally more important commercially than those with low traffic. The priority value can then be used to set the priority on the task Deploy solution. The rules actually deploy a solution through interfaces to MML or the trouble ticket system. For example, when appropriate, the rule could initiate a reset and record this in the log Performance check rules are typically classified into two groups depending on the approach taken to the high-level checks:

Delta checks. These look for changes in performance over time (for example, over the previous three weeks) and raise performance alert events when significant changes are found. These rules are generally good at picking up new and sudden changes in performance. However, they may not identify network elements that have had poor performance for some time or those that exhibit a gradual decline in performance. For this reason, threshold checks are generally also required.

Threshold checks. These compare performance with hard limits and raise performance alert events when the limits are breached.

In practice a combination of delta and threshold checks are generally required.

Design check rules perform checks on a combination of network configuration data and performance data.

Ad hoc rules can be used on an occasional or irregular basis to discover information about the state of the network (e.g. when performing proactive optimization). These rules might simply be used to display information rather than creating events and tasks. They might be created on a temporary basis or stored for future use.

The system uses a powerful new expression language called the Actix Extensible Expression Language or AXEL. This has been developed to provide an easy way to configure the system. Because the system consolidates network operators' processes into a single streamlined application and does not dictate what those processes should be, each customer can have different attributes, KPI calculations and rules for creating events and tasks. This means that the system needs a flexible and extensible mechanism for quickly and easily tailoring the system to meet each customer's specific requirements. All of the logic used within the system needs to be completely adaptable to match each customer's KPI definitions and processes. AXEL has been developed to answer this need. It is used throughout the system to define the formulas that are used for validating data and defining KPIs and the rules for generating performance alert and other events and for combining them into tasks.

AXEL enables the rules to be constructed independent of any specific data source, it exposes a plug-in API for interfacing with different data sources, it supports code-based and expression-based function libraries. Furthermore, new libraries can be written against the AXEL API and added to the product without recompiling the core system, and users can write their own function libraries and save them as XML. These can then be used in exactly the same way as the built-in functions. Users can also write custom implementations of core functions to extend or restrict functionality.

Example rules are shown below.

```
/*<Neighbor Handover Check >*/
declare numSectors     := 0;
declare numEvents      := 0;
declare numTasks       := 0;
declare window         := 21;
function OutgoingHandoverCount := Begin
    declare sourceSector   := #0;
    declare targetSector   := #1;
    declare count          := 0;
    for contextdate -> (contextdate - window) loop
        try
            count = count + HO__Attempts[targetSector, #item];
        end;
    end;
    yield count;
end;
function IncommingHandoverCount := Begin
    declare sourceSector   := #0;
    declare targetSector   := #1;
    declare count          := 0;
    for contextdate -> (contextdate - window) loop
        try
            count = count + HO__Attempts[targetSector, sourceSector, #item];
        end;
    end;
    yield count;
end;
AutoCacheAttributes(contextDate, ContextDate-window,
attr__ho__attempts); function DoSectorChecks :=
begin
    trace(format("Checking Sector {0}", contextelement));
    numSectors = numSectors + 1;
    declare neighbors       := FindNeighbourElements( );
    declare neighbor        := null;
    declare incommingCount  := 0;
    declare outgoingCount   := 0;
    for neighbors loop
        neighbor = #item;
        incommingCount        =
IncommingHandoverCount(contextElement, neighbor);
        outgoingCount = OutgoingHandoverCount(contextElement,
neighbor);
        Trace(Format("Handover count {0} Incomming = {1}.
Outgoing = {2}.", neighbor, incommingCount, outgoingCount));
            if incommingCount + outgoingCount == 0 then
                declare task := CreateTask(@"task__configuration alert",
Format("Unused neighbor {0} detected on sector {1}", neighbor,
ContextElement));
                numTasks = numTasks + 1;
                declare event := RaiseConfigurationAlert(contextelement,
Format("Neighbor {0} has not had any handover attempts (incomming
or outgoing) for {1} days", neighbor, window));
                numEvents = numEvents + 1;
                AssociateEventWithTask(task, event);
                AssociateElementWithTask(task, neighbor);
            end;
    end;
end;
function DoAreaChecks := begin
    trace(format("Checking Area {0}", contextarea));
    for sectorsinarea loop
        SetContextElement(#item);
        DoSectorChecks( );
    end;
```

```
end;
//main execution loop;
if contextelementisset then
    DoSectorChecks( );
else
    if contextareaisset then
        DoAreaChecks( );
    else
        for findallareas(cat_Reactive) loop
            SetContextArea(#item);
            DoAreaChecks( );
        end;
    end;
end;
```

The above rule loops across all sectors and for every sector it uses the AXEL function FindNeighbourElements( ). For each neighbor element found a functions are called to count both incoming and outgoing handovers along the relationship definition over a period of time. The counts are summed and if found to be zero and task is then raised. The idea behind this rule is to identify neighbor relationships that were not being used and could therefore be removed.

A further example is shown below

```
/*<Radio Checks >*/
///////////////////////////// Global declarations /////////////////////////
declare numSectors    := 0;
declare numEvents     := 0;
declare numTasks      := 0;
AutoCacheChildElements(level_sector, cat_iden, level_radio, cat_iden);
AutoCacheAttributes(contextdate, contextdate −1, attr_carriernumber);
function DoRadioCarrierNumberChecks := begin
    declare sector               := #0;
    declare radio                := null;
    declare carrierNumberToday   := 0;
    declare carrierNumberYesterday := 0;
    declare event                := null;
    for FindChildElements(sector, level_radio) loop
        try
            radio                  = #item;
            carrierNumberToday     = carrierNumber[radio];
            carrierNumberYesterday = carrierNumber[radio,
            contextdate −1];
            if carrierNumberToday != carrierNumberYesterday then
                event = RaiseConfigurationAlert(sector,
Format("Carrier number for radio {0} has changed
from {1} to {2}", radio, carrierNumberYesterday,
carrierNumberToday));
                numEvents = numEvents + 1;
            end;
        end;
    end;
```

```
end;
function DoSectorChecks := begin
    trace(format("Checking Sector {0}", contextelement));
    DoRadioCarrierNumberChecks(ContextElement);
end;
function DoAreaChecks := begin
    trace(format("Checking Area {0}", contextarea));
    for sectorsinarea loop
        SetContextElement(#item);
        DoSectorChecks( );
    end;
    declare radio   := null;
    declare sector  := null;
    for FindRemovedElementsInArea(contextArea, level_Radio,
    cat_iden) loop
        radio = #item;
        sector = FindParentElement(radio, level_sector, cat_iden);
        RaiseConfigurationAlert(sector, format("Radio {0}
        removed", radio));
        numEvents = numEvents + 1;
    end;
    for FindAddedElementsInArea(contextArea, level_Radio,
    cat_iden) loop
        radio = #item;
        sector = FindParentElement(radio, level_sector, cat_iden);
        RaiseConfigurationAlert(sector, format("Radio {0}
        added", radio));
        numEvents = numEvents + 1;
    end;
end;
// main execution loop
if contextelementisset then
    DoSectorChecks( );
else
    if contextareaisset then
        DoAreaChecks( );
    else
        for findallareas(cat_Reactive) loop
            SetContextArea(#item);
            DoAreaChecks( );
        end;
    end;
end;
```

As with the first example, the above rule loops over all sectors for a predefined area in this case performing configuration checks. The rule looks at the radios on each sector (using FindChildElements) an example of traversing the network hierarchy. This rule is looking for radios that have changed their carrier number since yesterday and raises an event if it finds a change. The rule also looks for radios that have been added or deleted from the system. The aim is to provide an event layer on which correlation with other events can be performed in the rules engine and/or simply provide context for engineer investigating a task.

A further example is shown below

```
// Check definition of 3G > 2G (adjw) with 2G > 2G (adce)
//declare NumNeighbours;
declare GSMNeighbours;
declare IRATNeighbours;
declare EquivGSMSource;
declare IRATNeighbour;
declare GSMNeighbour;
function neighbourfinder:= begin
    //NumNeighbours = 0;
    Declare Skip:= false;
    //find the gsm neighbours for the contextelement (which is cat_wcmda carrier 1)
    IRATNeighbours = findneighbourelements(cat_gsm);
    // Get the equivalent GSM source for the context element
    declare theparent:= findparentelement(contextelement, level_site);
    declare otherchild:= findchildelements(theparent,Level_Sector,cat_gsm);
    //yield otherchild;
    declare thesector:= substring(format("{0}",contextelement),7,1);
```

-continued

```
        //yield thesector;
        declare thissector:=null;
        if any((thesector == "a"), (thesector == "b"), (thesector == "c"), (thesector == "e"),
(thesector == "f"), (thesector == "g") ) then
            thissector = thesector;
        else
            if any((thesector == "A"), (thesector == "B"), (thesector == "C"), (thesector ==
"C"),(thesector == "D"),(thesector == "E") ) then
                    if thesector == "A" then
                        thissector = 'a'
                    end;
                    if thesector == 'B' then
                        thissector ="b";
                    end;
                    if thesector == "C" then
                        thissector = "c";
                    end;
                    if thesector == "E" then
                        thissector = "e";
                    end;
                    if thesector == "F" then
                        thissector = "f";
                    end;
                    if thesector == "G" then
                        thissector = "g";
                    end;
            Else
                    Trace(format("Sector is crazy!? {0}", thesector));
                    Skip = true;
            end;
        end;
        if not skip then
        for otherchild loop
            declare otherchildstring:= format("{0}",#item);
            if contains (otherchildstring, thissector) then
                EquivGSMSource = #item;
            end;
        end;
        // Probably want to check to see if the azimuth for the two sectors (to see if the are
aligned).
        try
            Declare Azimuth1:= azimuth[findchildelements(contextelement,level_antenna)];
            Declare Azimuth2:=
Azimuth[findchildelements(equivGSMSource,level_antenna)];
            Trace(format("Azimuth of {0} is {1}, Azimuth of {2} is {3}", contextelement,
azimuth 1, equivGSMSource, azimuth2));
        catch
            Trace(format("No Azimuth info available."));
        end;
        // Get the neighbours for the equivalent source
            try
                GSMNeighbours = findneighbourelements(EquivGSMSource, cat_gsm)
            catch
                trace(Format("No Such Source"));
                Skip = true;
            end;
        // Now check each IRATNeighbour against GSMNeighbours (Neighbours for the
Equivalent Source)
        if not skip then
        for IRATNeighbours loop
            IRATNeighbour = #item;
            declare IRATNeighbourString := format("{0}",#item);
            //trace (format("Searching for equivalent of IRAT pair: {0} > {1}; equivalent {2} >
{3}", contextelement, #item, EquivGSMSource, #item));
            declare index:=0;
            declare found:= false;
            declare missingtarget:=null;
            for GSMNeighbours loop
                declare GSMNeighbourString := format("{0}",#item);
                //Trace(format("Checking {0} against {1}", IRATNeighbour, #item));
                if IRATNeighbourString == GSMNeighbourString then
                    found = true;
                    missingtarget = #item;
                    //Trace(format("found equivalent neighbour for {0}", #item));
                end;
            end;    // gsmneighbours loop
            if not found then //check usage and if there is any usage then write message
                try
                    declare usagevalue:=0;
                    declare avgusage:= 0;
```

-continued

```
            declare numer:=0;
            declare denom:=0;
            declare window:= 14;
            For ContextDate – window -> ContextDate – 1 loop
                try usagevalue =
getvalue(attr_attempts,iratneighbour,#item);
                    denom = denom + 1;
                    numer = numer + usagevalue ;
                    end;
                end;
                if denom <> 0 then
                avgusage = numer/denom;
                    Trace(format("Could not find equivalent neighbour for {0} -> {1}.
Potential missing neighbour is {2} -> {3}", contextelement, iratneighbour, equivGSMsource,
iratneighbour));
                    Trace(format("Average Usage is: {0} (for {1} / {2} days)",
avgusage, denom, window));
                end;
            end;
        end;
        found = false;
    end;    //IRATNeighbours loop
end; //skip
End; //skip
end; //neighbour finder
Trace(format("Starting {0}", now));
for FindSectorsInArea(@'cat_wcdma carrier 1') loop
setcontextelement(#item);
trace (format("Checking IRAT versus GSM Neighbours for {0}", contextelement));
neighbourfinder(contextelement);
end;
Trace(format("Finish {0}", now));
```

The above example rule allows an engineer to compare the usage statistics of mobility between technology layers to determine if mobility relationships are missing between similar layers. The rule loops through all the sectors in one technology layer and finds a specified type of neighbor relationships (in this instance 3G>2G). The rule then uses network hierarchy (findparentelement) to find the site and back down the hierarchy to find the equivalent GSM sector. Once the specified relationships are found for this sector (2G>2G in the example) the two lists of neighbors are compared against common tuples. Where a relationship exists for the former layer but not for the later a check is made to see if the relationship is used and if so a message is written with supporting information to alert the engineer. This is a good example of an ad-hoc rule and in this case the rule simply output the results to a text format.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A system for maintaining or optimizing a mobile phone network, the system comprising:
a plurality of data feed inputs including at least one performance data feed input to receive performance data relating to performance of said mobile phone network over a first time period and at least one configuration data feed input to receive configuration data relating to configuration of said mobile phone network over a second time period; and
a radio performance optimization system coupled to said plurality of data feed inputs, said radio performance optimization system comprising a rules engine to operate on said performance data and on said configuration data in accordance with a set of hierarchical rules and to output one or more tasks for network optimization, a said task comprising a definition of at least one of a potential fault, exception, and optimization of said network to be investigated by a service engineer.

2. The system as claimed in claim 1, wherein said rules engine is configured to operate on said performance data and said configuration data using rules of at least two types, a first type of rule to generate event data defining events from one or both of said configuration data and said performance data, a said event identifying at least one of a spatial condition of said network and a temporal condition of said network, and a second type of rule to operate on at least said event data to identify a correlation in one or both of space and time in one or more of said event data, said configuration data, and said performance data, and wherein said set of hierarchical rules includes at least one rule of said first type and at least one rule of said second type.

3. The system as claimed in claim 2, wherein said second type of rule identifies a correlation between a spatial condition and a temporal condition of said network.

4. The system as claimed in claim 2, wherein said rules engine is configured to operate on said performance and configuration data using rules of a third type to infer at least one of a said potential fault, exception, and optimization for a said task.

5. The system as claimed in claim 4, wherein said rules engine is configured to operate on said performance and configuration data using rules of a fourth type to allocate a said task to a queue of tasks associated with a group of said service engineers.

6. The system as claimed in claim 2, wherein said rules engine is configured to operate on said performance and configuration data using rules of a fifth type to prioritize a said task.

7. The system as claimed in claim 2, wherein said mobile phone network has a plurality of cells and cell sectors, wherein said performance data and said configuration data comprise, respectively, data relating to performance and configuration of elements of said network in association with data identifying at least one of a cell and cell sector in which a said element is located, and wherein said rules engine is configured to operate on said performance and configuration data using rules which operate on data from elements of a selected said cell or cell sector.

8. The system as claimed in claim 7, wherein a said event is associated with a said cell or cell sector.

9. The system as claimed in claim 2, wherein said mobile phone network has a plurality of cells and cell sectors, and wherein said rules engine is configured to operate on said performance and configuration data using rules which operate on data from elements of neighbors of a selected said cell or cell sector, wherein a said neighbor of a selected said cell or cell sector comprises a cell or cell sector to which handover/handoff from said selected said cell or cell sector is permitted by said network.

10. The system as claimed in claim 9, wherein said rules engine is configured to operate on said performance and configuration data using rules of a type to construct a signature of a said cell or cell sector, said signature comprising a measure of the performance of said cell or cell sector, and to detect a change in said signature over a time period.

11. The system as claimed in claim 10, wherein said time period is at least 3 months.

12. The system as claimed in claim 2, further comprising a rule data store for storing said rules, and a user interface to enable a user to define one or more of said rules using a programming language which is able to provide a graphical representation of an operation performed by a rule operating on a plurality of said events.

13. The system as claimed in claim 1, wherein said data feed inputs further comprise an external event data feed input to receive external event data relating to said network, said external event data comprising at least data relating to one or more of network alarms, network elements reboots, and trouble tickets, wherein said rules engine is configured to operate on said external event data.

14. The system as claimed in claim 1, wherein said data feed inputs further comprise a drive test data feed input to receive drive test data relating to said network, wherein said rules engine is configured to operate on said drive test data.

15. The system as claimed in claim 1, further comprising a common interface between said plurality of data feed inputs and said radio performance optimization system, and wherein said common interface is configured to implement a set of procedures to operate on said data from said data feed inputs to provide a common data access specification for said data from said data feed inputs.

16. The system as claimed in claim 15, further comprising a data store coupled to at least one of said data feed inputs and to said common interface to store data from a said data feed input, and wherein said rules engine is configured to write result data resulting from operation of said rules on data from said data store into said data store for further operation by said rules engine on said result data.

17. The system as claimed in claim 1, wherein said mobile phone network has a plurality of cells and cell sectors, and wherein said radio performance optimization system rules engine is able to operate on a collection of data from said data feeds covering at least ten of said cells or cell sectors to output a said task without identification of a potential fault in said network, whereby said system is able to perform proactive optimization of said network.

18. The system as claimed in claim 1, further comprising an external interface to enable said radio performance optimization system to record action taken in response to a said task.

19. The system as claimed in claim 18, wherein said radio performance optimization system is able to correlate a said action with a charge in said performance data or in configuration data for learning a response to a cause of said action.

20. The system as claimed in claim 18, wherein said radio performance optimization system is able to use data from said data feed inputs to determine when a said task has been completed for automatically tracking implementation of said tasks.

21. The system as claimed in claim 1, further comprising a rule data store for storing said rules.

22. The system as claimed in claim 21, wherein said rule data store stores a set of said rules configured to operate on said performance and configuration data to determine one or more aggregated performance indicators for said network, a said aggregated performance indicator comprising an aggregated metric of performance of said network derived from data from a plurality of different elements of said network.

23. The system as claimed in claim 21, further comprising a user interface to enable a user to define one or more of said rules using a parsed expression language.

24. The system as claimed in claim 1, further comprising a graphical user interface (GUI) configurable to represent a said task on a geographical map of said network including representations of cells and cell sectors of said network, and wherein said GUI is configured to enable a user to, by selection of a said task, display data operated upon by a said rule in order to output the said task.

25. An automated performance management system for a digital mobile phone network, the system comprising:
  a rule input to receive rules for operating on data from said network;
  a data input to receive one or both of performance and configuration data from said network; and
  a rules engine coupled to said rule input and to said data input to operate on said data from said network using said rules, and wherein said rules engine comprises:
  an event layer to identify changes in one or both of said performance and configuration data and in response to generate events; and
  a correlation layer to operate on combinations of said events to identify potential faults, exceptions, or optimizations of said network.

26. The automated performance management system as claimed in claim 25, wherein said rules engine further comprises a diagnosis layer to operate on data from said correlation layer to increase a probability of said identification of said potential faults, exceptions, or optimizations.

27. The automated performance management system as claimed in claim 25, wherein said rules engine further comprises a workflow layer to allocate one or more of said potential faults, exceptions, or optimizations to one or more tasks to be performed in relation to said network and to output data identifying said one or more tasks.

28. The automated performance management system as claimed in claim 27, further comprising a task grouping system to allocate a said task to a queue of tasks.

29. The automated performance management system as claimed in claim 27, wherein said output data identifying said one or more tasks comprises graphical data to provide geographical indication of a location of said task in relation to one or more cells or cell sectors of said network for which said task is to be performed.

30. An interface to a plurality of data feed inputs from a digital mobile phone network, said interface comprising at least one performance data feed input to receive performance data relating to performance of said mobile phone network over a first time period and at least one configuration data feed input to receive configuration data relating to configuration of said mobile phone network over a second time period, wherein said interface is configured to implement a common set of procedures across said plurality of data feed inputs to provide a common data access specification for said data from said data feed inputs, wherein said procedures include one or more of a set of operator conversion procedures to map from a data format specific to an operator of said network to a data format of said common data access specification, a set of event procedures to identify or record events in said network, a set of network model procedures to provide data on configuration of elements of said network in said common data access specification, and a set of network attribute procedures to provide data relating to attributes of said network in said common data access specification.

* * * * *